United States Patent
Hoffmann et al.

(10) Patent No.: US 11,261,097 B2
(45) Date of Patent: *Mar. 1, 2022

(54) STABLE SMALL-PORE ZEOLITES

(71) Applicant: Umicore AG & Co. KG, Hanau-Wolfgang (DE)

(72) Inventors: Andreas Jan Hoffmann, Mechelen (BE); Michiel De Prins, Heverlee (BE); Sam Smet, Kessel-Lo (BE); Sreeprasanth Pulinthanathu Sree, Oud-Heverlee (BE); Elke Jane June Verheyen, Heverlee (BE); Johan Adriaan Martens, St-Joris-Weert (BE); Leen Van Tendeloo, Lier (BE); Frank-Walter Schuetze, Aschaffenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/053,206

(22) PCT Filed: May 13, 2019

(86) PCT No.: PCT/EP2019/062246
§ 371 (c)(1),
(2) Date: Nov. 5, 2020

(87) PCT Pub. No.: WO2019/219629
PCT Pub. Date: Nov. 21, 2019

(65) Prior Publication Data
US 2021/0070619 A1 Mar. 11, 2021

(30) Foreign Application Priority Data
May 14, 2018 (EP) ..................................... 18020207

(51) Int. Cl.
| | |
|---|---|
| *B01J 29/74* | (2006.01) |
| *B01J 35/04* | (2006.01) |
| *C01B 39/02* | (2006.01) |
| *F01N 3/20* | (2006.01) |
| *F01N 3/28* | (2006.01) |

(52) U.S. Cl.
CPC .............. *C01B 39/02* (2013.01); *B01J 29/743* (2013.01); *B01J 35/04* (2013.01); *F01N 3/2066* (2013.01); *F01N 3/2825* (2013.01); *F01N 2330/06* (2013.01); *F01N 2370/04* (2013.01); *F01N 2570/14* (2013.01)

(58) Field of Classification Search
CPC ............ B01D 53/9413; B01D 53/9418; B01D 53/9422; B01D 2255/20761; B01D 2255/50; B01D 2257/402; B01D 2257/404; B01D 2258/012; B01D 2258/014; B01J 29/04; B01J 29/044; B01J 29/072; B01J 29/06; B01J 29/7003; B01J 29/7015; F01N 3/10; F01N 3/2066; F01N 2370/04; F01N 2570/14
See application file for complete search history.

(56) References Cited

U.S. PATENT DOCUMENTS

| | | |
|---|---|---|
| 2015/0151286 A1 | 6/2015 | Rivas-Cardona |
| 2018/0127282 A1 | 5/2018 | Corma Canos |
| 2019/0143311 A1* | 5/2019 | Ando .................... B01J 35/04 |
| | | 423/213.5 |

FOREIGN PATENT DOCUMENTS

| | | | | |
|---|---|---|---|---|
| JP | S 5138321 B1 * | 10/1976 | ............. | C10G 11/05 |
| WO | 2017080722 A1 | 5/2017 | | |

OTHER PUBLICATIONS

International Search Report received in PCT/EP2019/062246, dated Aug. 6, 2019.
Written Opinion received in PCT/EP2019/062246, dated Aug. 6, 2019.

* cited by examiner

*Primary Examiner* — Timothy C Vanoy
(74) *Attorney, Agent, or Firm* — Suzannah K. Sundby, Esq.; Canady + Lortz LLP

(57) ABSTRACT

The present invention provides crystalline aluminosilicate zeolites having a maximum pore size of eight tetrahedral atoms, wherein the zeolite has a total proton content of less than 2 mmol per gram. The zeolite may comprise 0.1 to 10 wt.-% of at least one transition metal, calculated as the respective oxide and based on the total weight of the zeolite. It may furthermore comprise at least one alkali or alkaline earth metal in a concentration of 0 to 2 wt.-%, calculated as the respective metal and based on the total weight of the zeolite. The zeolites may be used for the removal of NOx from automotive combustion exhaust gases.

20 Claims, 20 Drawing Sheets

STABLE SMALL-PORE ZEOLITES

The present invention relates to hydrothermally stable crystalline aluminosilicate zeolites having a maximum pore size of eight tetrahedral atoms, wherein the zeolites have a total proton content of less than 2 mmol per gram, based on the total weight of the zeolite. The invention furthermore discloses a method for the selective catalytic reduction of nitrogen oxides by reaction with $NH_3$ as reductant ($NH_3$—SCR) wherein said hydrothermally stable zeolites are used.

A major driver for the recent and future development of catalysts are the increasingly stringent world-wide legislative emission levels for road (e.g. passenger cars, trucks) and non-road (e.g. ships, trains) applications. In the specific case of removing nitrogen oxides from the exhaust gas of lean burn engines, there is a global need for more active, more selective and more stable catalysts, due to tightened legislative emission levels and increased durability needs. One effective method to remove nitrogen oxides ($NO_x$) from the exhaust gas of these lean burn engines is selective catalytic reduction (SCR) with ammonia ($NH_3$). In $NH_3$—SCR, the $NO_x$ molecules are catalytically reduced to $N_2$ using $NH_3$ as reducing agent. Ammonia is usually fed as a less hazardous urea solution, which is decomposed to ammonia in the catalytic unit, and can be filled and stored in the vehicle in a dedicated reservoir.

Out of the different candidate catalyst materials, transition metal exchanged zeolites are found to be the best performing $NH_3$—SCR catalysts, especially in passenger cars and light duty vehicles. Zeolites are highly porous crystalline aluminosilicate materials with uniform pores and channels of molecular dimensions which occur in numerous framework structures. They are classified by the Structure Commission of the International Zeolite Association which defines respective framework types. The commission also assigns framework type codes consisting of three capital letters to all unique and confirmed framework topologies. For example, a widely used group of zeolites belongs to the faujasite framework to which the code FAU has been assigned. Zeolites can differ by framework type, as well as by chemical composition, atom distribution, crystal size and morphology.

It is common to classify zeolites according to their pore size which is defined by the ring size of the biggest pore aperture. Zeolites with a large pore size have a maximum ring size of 12 tetrahedral atoms, zeolites with a medium pore size have a maximum pore size of 10 and zeolites with a small pore size have a maximum pore size of 8 tetrahedral atoms. Well-known small-pore zeolites belong in particular to the AEI, CHA (chabazite), ERI (erionite), LEV (levyne) and KFI framework. Examples having a large pore size are zeolites of the faujasite (FAU) framework type.

Zeolites play an important role as catalysts in the so-called Selective Catalytic Reduction (SCR) of nitrogen oxides with ammonia to form nitrogen and water, and in particular if cations like copper and iron are included in the zeolite pores. They can perform over a broad temperature range in terms of conversion performance and selectivity. The SCR process has been widely used to remediate exhaust gases which result from the combustion of fossil fuels, in particular from stationary power plants and from vehicles powered by diesel engines. While zeolites occur in nature, zeolites intended for SCR or other industrial applications are usually manufactured via synthetic processes. Zeolites used for SCR or other industrial applications may comprise of one single zeolite framework type, an intergrowth, or a physical mixtures of more than one zeolite framework type and/or intergrowths.

Building on the classification proposed by Rao and Thomas, the different types of intergrowths relevant to zeolites are epitaxial and polytypical intergrowths, see CNR Rao and J M Thomas: "Intergrowth Structures: The Chemistry of Solid-Solid Interfaces", Acc Chem Res 1985, 13, 113-119. Epitaxy involves the oriented overgrowth of a zeolite crystal by a compositionally or structurally different zeolite phase, whereas polytypism arises when individual sheets in a layered material are stacked in different sequences.

As intergrowth, polytypism is a more common phenomenon in zeolite crystallization. It can be pictured as a stacking of different structurally uniform domains in each individual crystal, without any mismatch of bonds. The two, or more, types of domains can be structurally related, for example when they represent a different periodicity. This most often occurs as an alternative stacking of a common sheet.

Specifically for the ABC-6 zeolite family of materials, polytypism as an intergrowth is well known. Materials belonging to the ABC-6 family are for example chabazite, offretite, erionite, gmelinite, sodalite and levynite. The structure of zeolite materials in the ABC-6 family can be represented as a stacking of layers containing planar six-rings (6Rs). The 6Rs in one layer can be connected to the next layers of 6Rs in different ways. The three different locations of the 6Rs in a layer can be given as A, B or C. The 6Rs in the different layers can be connected parallel to each other (position A) or by a shift (position B and C), resulting in different frameworks belonging to the ABC-6 family. For example, offretite can be represented by three connecting layers with a stacking sequence of AAB, whereas the erionite contains 6 unique layers with a sequence of AABAAC. A stacking fault between one of these layers, where the stacking sequence is slightly altered at some places, easily occurs and results in intergrowths of different framework types. An example where the AAB stacking sequence of OFF zeolite is randomly replaced by AABAAC, or vice versa, is called an ERI/OFF intergrowth with the ERI and OFF framework type the end members of the ingrowth series. Zeolite T and ZSM-34 are the most common examples. Examples of materials that can make intergrowths with chabazite are zeolites with the GME and AEI framework type. Within the ABC-6 family, other intergrowths are theoretically possible, such as an intergrowth of chabazite (AABBCC) and offretite (AAB).

WO 2018/091583 A1 discloses crystalline zeolites with an ERI/CHA intergrowth framework type and to a process for making said zeolites. The ERI content of the zeolites ranges from 10 to 85 wt.-%, based on the total weight of ERI and CHA. The zeolites may further comprise 0.1 to 10 wt.-% copper, calculated as CuO, and one or more alkali and alkaline earth metal cations in an amount of 0.1 to 5 wt.-%, calculated as pure metals. The process for making the zeolites with an ERI/CHA intergrowth framework type comprises a) the preparation of a first aqueous reaction mixture comprising a zeolite of the faujasite framework type, Cu-TEPA and a base M(OH), b) the preparation of a second aqueous reaction mixture comprising a silica source, an alumina source, an alkali or alkaline earth metal chloride, bromide or hydroxide, a quaternary alkylammonium salt and hexamethonium bromide, c) combining the two reaction mixtures, and d) heating the combination of the two reaction mixtures to obtain a zeolite with an ERI/CHA intergrowth framework type. The ERI/CHA intergrowth zeolite may subsequently be calcined. The zeolites according to this invention are suitable SCR catalysts.

Intergrowth zeolites with AFX/CHA structure are disclosed in Y Naraki, K Ariga, K Nakamura, K Okushita and T Sano: "ZTS-1 and ZTS-2: Novel intergrowth zeolites with AFX/CHA structure", Microporous Mesoporous Mater 2017, 254, 160-169. Novel AFX/CHA aluminosilicate intergrowth zeolites ZTS-1 and ZTS-2 were synthesized using the dual structure-directing agent (dual-SDA) approach. ZTS-1 was obtained using the 1,10-(1,4-butanediyl)bis(1-azonia-4-azabicyclo[2,2,2]octane) dication (Dab-$4^{2+}$) and the N,N,N-trimethyl-1-adamantylammonium cation (TMAda$^+$) as organic structure-directing agents (OSDAs) for AFX and CHA phases, respectively. The obtained materials were characterized by powder X-ray diffraction (XRD), scanning electron microscopy (SEM), inductively coupled plasma atomic emission spectroscopy (ICP-AES), electron diffraction, high-resolution transmission electron microscopy (HRTEM), solid-state $^{13}$C dipolar decoupled magic-angle-spinning nuclear magnetic resonance ($^{13}$C DD/MAS NMR), thermogravimetric and differential thermal analysis (TG/DTA), CHN analysis, and $N_2$ adsorption. The combined results of these characterizations and those of the DIFFaX simulation showed that the AFX/CHA ratio of ZTS-1 was 80-85% AFX and 15-20% CHA (based on the number of unit cells). Control of the AFX/CHA ratio by simple variation of the hydrothermal synthetic parameters proved to be challenging. The catalytic performance of Cu-loaded ZTS-1 was tested in the selective catalytic reduction of $NO_x$ with $NH_3$ ($NH_3$—SCR), and its higher hydrothermal stability compared to the Cu-loaded AFX catalyst was confirmed. ZTS-2 was synthesized using K$^+$ instead of TMAda$^+$, under synthetic conditions completely different from those used for ZTS-1. The AFX/CHA ratio of ZTS-2 was estimated as 15-20% AFX and 80-85% CHA, strongly indicating the possibility of controlling the above ratio.

Many of the intergrowth materials show special catalytic, sorptive or molecular separation properties compared to their phase pure endmembers.

There is an ongoing search for new zeolite materials with improved hydrothermal stability, next to improved catalytic activity and selectivity, in a wide range of applications. For example, to remediate exhaust gases resulting from the combustion of fossil fuels, in particular from stationary power plants and from vehicles powered by diesel engines, Selective Catalytic Reduction (SCR) is widely used. Zeolites loaded with copper and/or iron play an important role as SCR catalytically active materials and reduce harmful nitric oxides using ammonia to form nitrogen gas and water.

The hydrothermal stability requirements for $NH_3$—SCR catalytically active materials are severe, especially when this catalytic function is to be integrated upstream, downstream or in the particulate filtering devices where the temperature during operation or regeneration can reach up to 900°.

It is known to the skilled person that zeolites have several different hydroxyl groups. Bridging hydroxyl groups (SiO-HAl groups) are observed on most types of zeolites. In addition, two different types of silanol groups (Si—OH groups) are usually present on zeolites: hydroxyl groups (OH groups) on the outer surface terminating the zeolite crystal and OH groups on structural defects resulting from an incomplete condensation or from the removal of lattice atoms. This is described, for instance, in P A Jacobs, E M Flanigan, J C Jansen and H van Bekkum (eds.): "Introduction to Zeolite Science and Practice", Elsevier, $2^{nd}$ Edition 2001, Chapter 8, 5, 2, 1 "Surface hydroxyl groups", p. 370.

Furthermore, it is known that the amount of silanol groups in a zeolite has an influence on the hydrothermal stability of the zeolite.

WO 2017/204212 A1 discloses a CHA-type zeolite which is highly crystalline and has a molar ratio of silanol to silicon within certain ranges, depending on the molar ratio of silica to alumina. The silanol content is determined by 300 MHz $^1$H-NMR at a 4 kH spinning speed. The raw NMR data were analysed by fitting of a peak with a maximum between 1.5 and 2.5 ppm, wherein said maximum is assigned to the silanol (Si—OH) peak. Absolute quantities of the silanol content are obtained by a curve calibration method. The silicon content is determined by measuring the intensity of the fluorescent X-ray peak corresponding to silicon. This intensity is compared with a calibration curve in order to calculate the silicon content. The silanol group content (mol/g) of the zeolite measured by $^1$H-NMR with respect to the silicon content (mol/g) of the zeolite obtained by fluorescent X-ray measurement was taken as the SiOH/Si ratio. For a molar ratio of silica to alumina between 10 and 20, the molar ratio of silanol groups to silicon is between $0.15\times10^{-2}$ and $0.50\times10^{-2}$. For a molar ratio of silica to alumina between 20 and 35, the molar ratio of silanol groups to silicon is between $0.15\times10^{-2}$ and $1.10\times10^{-2}$. For a molar ratio of silica to alumina between 35 and 45, the molar ratio of silanol groups to silicon is between $0.15\times10^{-2}$ and $1.65\times10^{-2}$. For a molar ratio of silica to alumina between 45 and 55, the molar ratio of silanol groups to silicon is between $0.15\times10^{-2}$ and $1.80\times10^{-2}$. The collapse of the skeleton structure of the zeolite in high-temperature environments is correlated to an increased content of silanol species. The CHA-type zeolites described in this invention have been ascribed to satisfy a specified range of Si—OH/Si, which causes the CHA to withstand framework collapse during thermal or hydrothermal treatments and thus shows high heat resistance. Because of this characteristic, these CHA zeolites and CHA zeotypes are suitable as catalyst or a catalyst carrier, particularly as a nitrogen oxide reduction catalyst or carrier thereof. The CHA zeolites and CHA zeotypes disclosed in WO 2017/204212 A1 comprise alkali metals such as sodium and potassium, and they may also be ion exchanged with ammonium cations to yield either the ammonium or the proton type zeolite. However, the disclosure is silent about CHA zeolites and CHA zeotypes which comprise a transition metal such as copper or iron.

WO 2017/026484 A1 discloses a production method for an AEI zeolite without inducing a structural transformation in a crystalline aluminosilicate having a Y structure. The method is characterized by having a crystallization step for crystallizing a composition that contains an alumina source, a silica source, a structure-directing agent, a sodium source, and water, wherein the weight ratio of crystalline aluminosilicate to the total weight of the alumina source and the silica source combined is 0 to 10 wt.-%; and wherein at least one of the following conditions is satisfied: (a) the molar ratio of hydroxide ions to silica in the composition is 0.45 or higher; (b) the composition contains cations represented by $(CH_3)_3RN+$, wherein R is an alkyl group with 1 to 4 carbon atoms, and the alkyl group may include one or more substituents, and (c) the crystallization time is 80 hours or longer. The AEI type zeolite obtained by this method has a silanol to silicon ratio (SiOH:Si) of $3\times10^{-2}$ or less. The examples provided in WO 2017/026484 A1 show SiOH:Si ratios of 0.60 to $0.95\times10^{-2}$. The silanol content is measured by $^1$H-NMR, and the silanol content is determined by measuring the intensity of the fluorescent X-ray peak as described above for WO 2017/204212 A1.

The AEI zeolites and AEI zeotypes disclosed in WO 2017/026484 A1 comprise alkali metals such as sodium and potassium, and they may also be ion exchanged with ammonium cations to yield either the ammonium or the proton type zeolite. The AEI zeolites and AEI zeotypes may also contain at least one transition metal selected from copper and iron. Due to their high heat resistance, they may be used as nitrogen oxide conversion catalysts.

In M Houlleberghs, A Hoffmann, D Dom, C E A Kirschhock, F Taulelle, J A Martens and E Breynaert: "Absolute Quantification of Water in Microporous Solids with $^1$H Magic Angel Spinning NMR and Standard Addition", Anal Chem 2017, 89, 6940-6943, a method for determining the absolute water content in microporous materials, in particular zeolites, is described. The water content of a zeolite sample was determined via standard addition of water and $^1$H NMR. The zeolite sample was filled in a 4 mm $ZrO_2$ rotor, and afterwards, known aliquots of water were added in the rotor. By measuring the $^1$H NMR spectrum of all hydration steps of the sample, a linear correlation function (y=Ax+B) can be determined, wherein y is the $^1$H NMR surface area of the $H_2O$ peak, x is the amount of added $H_2O$, calculated as moles $^1$H, and B is the intercept, which is dependent on the total proton content of the pristine sample. The slope A (counts/moles $^1$H) and corrected intercept B can be combined to determine the absolute proton content of the $H_2O$ peak (moles $^1$H/g sample). To specifically obtain the water content of the pristine sample, the surface area of the $^1$H NMR spectrum of all hydration steps of the sample has to be corrected for non-$H_2O$ species, such as Brönsted acid protons, silanols, aluminols. To obtain the surface area of these residual signals, the $ZrO_2$ rotor containing sample is dried under vacuum (<1 mbar) at 60° C. for 16 hours and capped after flushing with $N_2$. The surface area of the residual peaks is subsequently measured using $^1$H NMR and used to correct the surface area of the $^1$H NMR spectrum of all hydration steps of the sample as to obtain a correct value for the intercept B.

US 2018/0127282 A1 discloses a process for the direct synthesis of a material with a CHA zeolite structure in the silicoaluminate form thereof containing copper atoms, which comprises at least the following steps: i) preparation of a mixture which contains at least one water source, one copper source, one polyamine, one source of Y tetravalent element, one source of X trivalent element, the tetraethylammonium cation as the only OSDA and one source of alkaline or alkaline earth (A) cations, and wherein the synthesis mixture has the following molar composition: $YO_2$:a $X_2O_3$:b OSDA:c A:d $H_2O$:e Cu:f polyamine; ii) crystallization of the mixture obtained in i) in a reactor; iii) recovery of the crystalline material obtained in ii). Preferably, Y is Si, X is Al, and the polyamine is tetraethylene pentamine. The parameters a to f may vary in a wide range: a ranges between 0.001 and 0.2, b ranges between 0.01 and 2, c ranges between 0 and 2, d ranges between 1 and 200, e ranges between 0.001 and 1 and f ranges between 0.001 and 1. In the examples provided in US 2018/0127282 A1, the synthesis mixtures are maintained under agitation, then part of the water is evaporated, and the crystallization is carried out under static conditions. The chabazites disclosed in the examples show good NOx conversion rates up to 450° C., whereas the NOx conversion rate sinks significantly when the temperature rises to 500° C. US 2018/0127282 A1 is silent about the hydrothermal stability of the chabazites above 500° C., and it is also silent about their content of SiOH, AlOH, SiOHAl or other proton-containing groups.

US 2015/0151286 A1 discloses a composition having a CHA framework structure, a molar silica-to-alumina ratio (SAR) of about 10 to about 30, and an in-situ transition metal, wherein the zeolite substance is essentially alkali-free. The zeolite is synthesized by preparing a reaction mixture comprising a) at least one source of alumina, b) at least one source of silica, c) a transition metal-amine organic templating agent, and d) a distinct second organic templating agent, wherein each of the first and the second templating agent is suitable for forming a CHA framework structure and wherein the reaction mixture is essentially free of alkali metal; heating the reaction mixture at crystallization conditions for a sufficient time to form zeolite crystals having a CHA framework and containing the transition metal. The transition metal preferably is copper. The first organic templating agent is a transition metal-amine complex, preferably copper tetraethylene pentamine. The second organic templating agent is an organic ammonium ion having two optionally substituted hydrocarbyl groups, an alkyl group with two to four carbon atoms, and a cyclic hydrocarbyl group having at least three carbon atoms and a nitrogen atom. Preferred second organic templating agents are benzyltrimethylammonium, tetramethylammonium, 1-adamantyltrimethylammonium and N,N,N-triethylcyclohexylammonium cations. The reaction mixture is usually stirred or agitated for several minutes at room temperature. The hydrothermal crystallization is usually conducted under autogeneous pressure at temperatures of about 100 to 200° C. for a duration of several days. The synthesis method disclosed is a one-pot method. However, US 2015/0151286 A1 only discloses ranges of the molar ratios of the gel components (silicon source, aluminium source, template, transition metal, and water), but no exact ranges. The chabazite obtained by the method of US 2015/0151286 A1 is compared with a chabazite synthesized using Cu-TEPA as the sole templating agent. The chabazite synthesized according to US 2015/0151286 A1 shows improved NOx conversion rates compared to the comparative example over the entire temperature range considered, which is between 150 and 500°. However, above 350° C., the NOx conversion rate of the chabazite according to US 2018/0151286 A1 decreases significantly, even if it remains much higher than that of the comparative example. The disclosure is silent about the hydrothermal stability of the chabazite above 500° C., and it is also silent about the content of SiOH, AlOH, SiOHAl or other proton-containing groups.

WO 2017/080722 A1 discloses a one-pot synthesis of copper-containing small-pore zeolites which comprises preparing a reaction mixture comprising a zeolite of the faujasite framework type, Cu tetraethylenepentamine (Cu-TEPA) and at least one compound M(OH)x, which does not comprise the tetraethylammonium cation, and heating the reaction mixture to form a copper containing small-pore zeolite. M(OH)x is an alkali or alkaline earth metal hydroxide. According to the method disclosed, the synthesis gel is stirred, but the crystallization takes place under static conditions. WO 2017/080722 A1 is silent about the NOx conversion of the zeolites obtainable by the method, and it does not mention their hydrothermal stability or their content of SiOH, AlOH, SiOHAl or other proton-containing groups, either.

US 2016/0107119 A1 and US 2018/0021725 A1, both belonging to the same patent family, disclose Cu-exchanged zeolite catalysts with a chabazite structure containing selected concentrations of alkali ions or alkaline earth ions and a lower concentration of Cu ions as well as a process for making said chabazites. These catalysts show reduced lightoff temperatures and thus provide an enhanced low-temperature conversion of $NO_x$ gases. Furthermore, these chabazites exhibit high selectivity values compared to conventional $NO_x$ reduction catalysts.

US 2016/0107119 A1 claims a process for the fabrication of a $NO_x$ reduction catalyst, wherein a synthetic chabazite is first loaded with an alkali or alkali earth metal ion in a concentration of between about 0.01 to at or below about 5 weight percent, followed by loading the synthetic zeolite with copper ions to a concentration of about 0.01 to at or below about 2 weight percent. The chabazites thus obtained show both an enhanced low temperature and high temperature activity.

US 2018/0021725 A1 claims a synthetic chabazite that contains less than two percent copper metal by weight and incorporates at least one metal selected from Na, Li, K and Ca. This chabazite is produced by fabricating a synthetic chabazite zeolite in sodium form, ammonium-exchanging the sodium, following by exchanging the ammonium ions with a single alkali or alkaline earth metal, calcining the zeolite, and finally exchanging a quantity of the alkali or alkaline earth metal with copper. After the copper exchange, the zeolite is hydrothermally aged. The copper content of the final chabazite zeolite is between above zero and two percent by weight.

Both US 2016/0107119 A1 and US 2018/0021725 A1 indicate that the combination of a low copper content and a low alkali or alkaline earth metal content contribute to the temperature range in which the chabazite shows enhanced $NO_x$ conversion activity. However, both applications are silent about the hydrothermal stability of the disclosed chabazites or factors that might be responsible for said stability.

There is a constant need of new zeolites with good $NO_x$ conversion rates and a high heat resistance, in particular with regard of their use in SCR applications. It is therefore an object of the present invention to provide zeolites which show improved selectivity, activity and hydrothermal stability, and a process for the removal of $NO_x$ from automotive combustion exhaust gases wherein these zeolites are used as the catalyst.

Solution of the Problem

The inventors of the present invention have now surprisingly found crystalline aluminosilicate zeolites having a maximum pore size of eight tetrahedral atoms, wherein the zeolite has a total proton content of less than 2 mmol per gram.

The novel crystalline aluminosilicate zeolites according to the present invention and the process for the removal of $NO_x$ from automotive combustion exhaust gases wherein these zeolites are used as the catalyst are explained below, with the invention encompassing all the embodiments indicated below, both individually and in combination with one another.

As used in the present invention, the term "phase-pure zeolite" refers to a zeolite that is composed of crystals having only one crystal structure, i.e. the crystals contain no other crystal structure.

A crystal structure is a description of the ordered arrangement of atoms, ions, or molecules in a crystalline material. Ordered structures occur from the intrinsic nature of the constituent particles to form symmetric patterns that repeat along the principal directions of three-dimensional space in matter. A "crystal" therefore represents a solid material whose constituents are arranged in a crystal structure.

A "crystalline substance" is composed of crystals.

A "zeolite framework type", also referred to as "framework type", represents the cornersharing network of tetrahedrally coordinated atoms.

A "CHA framework type material" is a zeolitic material having a CHA framework type. The same applies, mutatis mutandis, for an "ERI framework type material", an "AEI framework type material", and other zeolite framework type materials. Often, zeolite framework type materials are referred to as "zeotypes" or "isotypic framework structures". A common definition for a zeotype or an isotypic framework structure, respectively, is that it deals with any of a family of artificial materials based on the structure of zeolites. Thus, the terms "zeotype", "isotypic framework structure" and "zeolitic framework type material" are used synonymously. Well-known zeotypes are, for instance, SSZ-39, which is an AEI zeotype, and SSZ-13, which is a CHA zeotype.

An "intergrowth" of a zeolite comprises at least two different zeolite framework types or two different zeolite compositions of the same framework type.

In an "overgrowth" zeolite, one framework structure grows on top of the other one. Thus, "overgrowth" represents a species of "intergrowth", and "intergrowth" is the genus.

A "mixture" is a material made up of two or more different substances which are mixed but are not combined chemically. In the present invention, the two or more different substances which for a mixture are zeolites.

It has surprisingly been found that the total proton content of a zeolite is a better indicator for the hydrothermal stability of said zeolite than the silanol to silicon content. The total proton content can be measured on the calcined dry proton form of the respective dry zeolite as explained further below. The calcined dry proton form of a zeolite is hereinafter also referred to as "the calcined dry zeolite in the proton-exchanged form" or "the calcined dry H zeolite". Zeolites according to the present invention, which have a total proton content of less than 2 mmol per gram, preferably less than 1.8 mmol per gram, more preferably 1.6 mmol per gram and even more preferably less than 1.3 mmol per gram, based on the total weight of said calcined dry proton form, show a significantly improved hydrothermal stability of 800° C. and above. It is however important to underline that zeolites according to the present invention which comprise a) transition metals like copper and/or iron and/or b) alkali and/or alkaline earth metals as described below are hydrothermally stable at 800° C. and above as their corresponding calcined dry H forms.

The terms "the zeolites" or "the zeolites according to the present invention" refer to all crystalline aluminosilicate zeolites having a maximum pore size of eight tetrahedral atoms and a total proton content of less than 2 mmol per gram, based on the total weight of the zeolite as disclosed herein, irrespective of whether they are substantially free of alkali, alkaline earth and transition metals or comprise said metals as described in the following.

In the scientific world, the term "transition metals" refers to the metals of the groups 3 to 12 of the periodic table. This definition also includes the platinum group metals ruthenium, rhodium, palladium, osmium, iridium and platinum. However, the platinum group metals (PGM) are often considered a specific sub-group among the transition metals. Furthermore, in the technical field of combustion exhaust purification, the term "transition metals" mostly refers to transition metals other than the platinum group metals, in particular to transition metals of the fourth period of the periodic table, and platinum group metals are explicitly named as such. In accordance with this common practice, the term "transition metals" in the present invention refers to metals other than the PGM metals, preferably to transition metals of the fourth period, and more preferably to copper and iron. Platinum group metals are expressly named as such.

Suitable crystalline aluminosilicate zeolites having a maximum pore size of eight tetrahedral atoms are, for instance, zeolite framework type materials chosen from ACO, AEI, AEN, AFN, AFT, AFX, ANA, APC, APD, ATT, BIK, CDO, CHA, DDR, DFT, EAB, EDI, EPI, ERI, ESV, ETL, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures and intergrowths that contain at least one of these framework types.

In one embodiment of the present invention, the zeolites are chosen from AEI, AFT, AFX, CHA, DDR, ERI, ESV, ETL, KFI, LEV, UFI and mixtures and intergrowths thereof. Preferably, the zeolites are chosen from AEI, CHA, AFX and mixtures and intergrowths that contain at least one of these framework types. In a particularly preferred embodiment, the zeolite is AEI.

In one embodiment, the "mixtures and intergrowths that contain at least one of these framework types" consist only of zeolite framework types that are listed above, e.g. a physical mixture of CHA and AEI, a physical mixture of KFI and ESV, a physical mixture of LEV, ERI and BIK, an intergrowth of ERI and CHA, or an intergrowth of AFX and CHA. In another embodiment, the "mixtures and intergrowths that contain at least one of these framework types" comprise at least one of the zeolite framework types that are listed above, but also other zeolite framework types. Examples are: a physical mixture of CHA and GME or an intergrowth of ERI and OFF.

Exemplary isotypic framework structures of the zeolite framework type materials listed above are listed in Table 1:

| Zeolite Framework Type | Isotypic framework structures |
|---|---|
| ACO | ACP-1 |
| AEI | SIZ-8 |
|  | SSZ-39 |
| AEN | CoIST-2 |
|  | IST-2 |
|  | JDF-2 |
|  | MCS-1 |
|  | Mu-10 |
|  | UiO-12-500 |
|  | UiO-12-as |
| AFX | SSZ-16 |
| ANA | Analcime |
|  | Hsianghualite |
|  | Leucite |
|  | Pollucite |
|  | Wairakite |
| ATT | RMA-3 |
| BIK | EU-7 |
|  | Bikitaite |
| CDO | CDS-1 |
|  | MCM-65 |
|  | UZM-25 |
| CHA | Chabazite |
|  | DAF-5 |
|  | Linde D |
|  | Linde R |
|  | LZ-218 |
|  | Phi |
|  | SSZ-13 |
|  | SSZ-62 |
|  | UiO-21 |
|  | Wilhendersonite |
|  | ZK-16 |
|  | ZYT-6 |
| DDR | Deca-dodecasil 3R |
|  | Sigma-1 |
|  | ZSM-58 |
| DFT | DAF-2 |
| EAB | TMA-E |
|  | Belbergite |
| EDI | Edingtonite |
|  | K-F |
|  | Linde F |
|  | Zeolite N |
| EPI | Epistilbite |
| ERI | Erionite |
|  | Linde T |
|  | LZ-220 |
|  | ZSM-34 |
| ESV | ERS-7 |
| GIS | Gismondine |
|  | Garronite |
|  | Gobbinsite |
|  | TMA-Gismondine |
| GOO | Goosecreekite |
| IHW | ITQ-32 |
| ITE | ITQ-3 |
|  | Mu-14 |
|  | SSZ-36 |
| LEV | Levyne |
|  | LZ-132 |
|  | NU-3 |
|  | ZK-20 |
| KFI | ZK-5 |
|  | P |
|  | Q |
| MER | Merlinoite |
|  | K-M |
|  | Linde W |
|  | Zeolite W |
| MON | Montesommaite |
| NSI | Nu-6(2) |
| OWE | UiO-28 |
|  | ACP-2 |
| PAU | Paulingite |
|  | ECR-18 |
| PHI | Phillipsite |
|  | DAF-8 |
|  | Harmotome |
|  | Wellsite |
|  | ZK-19 |
| RHO | Rho |
|  | LZ-214 |
|  | Pahasapaite |
| RTH | RUB-13 |
|  | SSZ-36 |
|  | SSZ-50 |
| SAT | STA-2 |
| SIV | SIZ-7 |
| THO | Thomsonite |
| TSC | Tschortnerite |
| UEI | Mu-18 |
| UFI | UZM-5 |
| VNI | VPI-9 |
| YUG | Yugawaralite |
|  | Sr-Q |
| ZON | UiO-7 |

Methods to synthesize the aluminosilicates having a maximum pore size of eight tetrahedral atoms are known to the skilled person.

The total proton content is measured on the calcined dry zeolite in the proton-exchanged form via $^1$H MAS NMR, wherein "MAS NMR" stands for "magnetic angle spinning nuclear magnetic resonance".

Prior to the $^1$H MAS NMR measurement, the zeolites have to be substantially free of alkali and/or alkaline earth metals and transition metals that disturb the NMR measurement due to their magnetic properties. The skilled person knows which elements disturb the NMR measurement. Such elements can be eliminated by ion exchange as described below.

"Substantially free of alkali and/or alkaline earth metals" means that the zeolite comprises less than 0.3 wt.-% of said metals, calculated as pure alkali and/or alkaline earth metals and based on the total weight of the calcined dry proton-exchanged zeolite. In one embodiment, the zeolite does not comprise any alkali and/or alkaline earth metal at all. In this case, the content of these metals is 0 wt.-% for obvious reasons. In another embodiment, the zeolite comprises alkali and/or alkaline earth metals in a range between larger than zero and 0.3 wt.-%, preferably 0.005 to 0.3 wt.-% of these metals, calculated as pure metals and based on the total weight of the calcined dry proton-exchanged zeolite. The alkali or alkaline earth metals are chosen from lithium, sodium, potassium, rubidium, cesium, magnesium, calcium, strontium, barium, and mixtures thereof. Preferably, the alkali and/or alkaline earth metals are chosen from sodium, potassium, and mixtures thereof. The skilled persons knows that content of alkali and alkaline earth metals can be measured by AAS, and he can apply this knowledge without leaving the scope of protection of the claims.

"Substantially free of transition metals" means that the zeolite comprises less than 0.08 wt.-% of at least one transition metal, calculated as the respective oxides and based on the total weight of the calcined dry proton-exchanged zeolite, and it can be measured by ICP. The at least one transition metal is chosen from the elements of the groups 3 to 12 of the periodic table. Preferably, the at least one transition metal is chosen from copper, iron and mixtures thereof. In this case, the transition metal content is calculated as CuO or $Fe_2O_3$, respectively. In one embodiment, the zeolite does not comprise any transition metal at all. In this case, the content of these metals is 0 wt.-% for obvious reasons. In another embodiment, the zeolite comprises transition metals, preferably in a range between larger than zero and up to 0.08 wt.-% calculated as the respective oxides and based on the total weight of the calcined dry zeolite.

Thus, the calcined dry proton-exchanged zeolites may
a) contain 0 wt.-% of alkali and/or alkaline earth metals, calculated as pure metals and based on the total weight of the calcined dry proton-exchanged zeolite, and 0 wt.-% of transition metals, calculated as the respective oxides and based on the total weight of the calcined dry proton-exchanged zeolite, or
b) contain 0 wt.-% of alkali and/or alkaline earth metals, calculated as pure metals and based on the total weight of the calcined dry proton-exchanged zeolite, and larger than zero and up to 0.08 wt.-% of transition metals, calculated as the respective oxides and based on the total weight of the calcined dry proton-exchanged zeolite,
c) contain alkali and/or alkaline earth metals in a range between larger than zero and 0.3 wt.-%, calculated as pure metals and based on the total weight of the calcined dry proton-exchanged zeolite, and 0 wt.-% of transition metals, calculated as the respective oxides and based on the total weight of the calcined dry proton-exchanged zeolite, or
d) contain alkali and/or alkaline earth metals in a range between larger than zero and 0.3 wt.-%, calculated as pure metals and based on the total weight of the calcined dry proton-exchanged zeolite, and larger than zero and up to 0.08 wt. % of transition metals, calculated as the respective oxides and based on the total weight of the calcined dry proton-exchanged zeolite.

The procedure to carry out the $^1H$ MAS NMR measurement is as follows:

The as made zeolite is calcined in air at a temperature of 500 to 650° C. for 4 to 10 hours, preferably for 8 hours, with a heating rate of 0.5 to 1° C. per minute. The "as made zeolite" is the zeolite obtained after the synthesis.

After the calcination, ion exchange is carried out in order to remove alkali, alkaline earth and/or transition metals. The ion exchange is carried out by treating the calcined zeolite with an ammonium salt, preferably ammonium chloride, ammonium sulfate or ammonium nitrate. The calcined zeolite is suspended in an aqueous ammonium salt solution and heated under reflux upon stirring, preferably for 3 to 5 hours, followed by centrifugation. It is suitable to suspend 0.9 to 1.1 grams of the zeolite in 100 ml of an aqueous ammonium salt solution having an ammonium ion concentration of 0.45 to 0.55 M. The combination of ion exchange and centrifugation can be repeated a number of times.

Preferably, this combination is carried out three times in total. Repeatedly combining ion exchange and centrifugation, for instance for three times, typically yields a zeolite having a content of 0 to 0.3 wt.-% of alkali and/or alkaline earth metals and a transition metal content of 0 to 0.08 wt.-%, wherein the measurement and calculation of these metals contents are carried out as described above.

The solid ion-exchanged zeolite is then recovered, washed with deionized water and recovered by centrifugation. Subsequently, the zeolite is dried at a temperature between 25° C. and 80° C. for 2 to 36 hours. Preferably, the drying step is carried out at 60° C. for 8 hours.

The drying step is followed by a calcination in air at a temperature of 600° C. to 650° C. for 4 to 8 hours with heating rate of 0.5 to 1° C. per minute. Preferably, this calcination is carried out at 650° C. for 8 hours with a heating rate of 1° C. per minute.

Finally, the zeolite is packed in a 4 mm zirconia solid state NMR rotor and dried under vacuum (<1 mbar) at 90° C.±1° C. for 30 min±5 min and at 200° C.±5° C. for 16 to 29 hours. The zeolites obtained after the vacuum drying are "the calcined zeolites in the proton-exchanged form' as described above. On this material, $^1H$ MAS NMR is performed for the determination of the proton content.

Absolute quantification of the integrated area of the $^1H$ MAS NMR spectrum was performed via standard addition as described in Houlleberghs et al. (2017) to yield the absolute amount of H (mmol/g). A known amount of deionized $H_2O$ was added to the dried zeolite in the packed rotor. A homogeneous distribution of water throughout the sample was achieved via heating the capped rotor at a temperature of 323-343 K for 10-20 h, preferably at 333 K for 16 h. The $^1H$ MAS NMR experiment was performed in the same way as on the dried sample. This procedure was performed for 5 different $H_2O$ amounts. For absolute quantification, it important that all measurements and pretreatments of the calcined dry H-zeolite and said zeolite with an additional $H_2O$ amount are performed in the exact same way. A linear correlation was obtained between the integrated $^1H$ NMR signals of the (de)hydrated zeolite samples and the amount of H added (mol $^1H$). In this way the integrated area of the $^1H$ NMR spectra of the dried spectrum could be translated in the absolute amount of protons (mmol/g). Probe tuning and matching was carried out using a vectorial Network Analyzer to ensure comparable Q (quality) factors between the (de)hydrated states as to maximize accuracy and reproducibility when acquiring the linear correlation function.

The Q factor of all samples, the calcined dry H-zeolites and the hydrated zeolites, can vary by 10%.

$^1$H MAS NMR experiments are performed at a temperature of 273-303 K, preferable at 293 K. The measurement is carried out on a 500 MHz spectrometer (static magnetic field of 11.7 T) equipped with a 4 mm H/X/Y magic angle spinning (MAS) solid-state probe. Samples were spun at 10 kHz. $^1$H spectra were recorded using a π/2 flip angle and a repetition delay of 5 s. Adamantane was used as an external secondary reference for the chemical shift referencing to tetramethylsilane (TMS). The resulting spectrum was phased properly according to the shape of the spinning side bands. The baseline was manually corrected pursuant to the minima between the main signal and its neighboring spinning side bands. The $^1$H spectra were integrated between 20 and −8 ppm using Bruker Topspin 3.5 software.

It is not necessary to subject the entire amount of a synthesized zeolite to the procedure as described above to carry out the $^1$H MAS NMR measurement. It is advantageous to use only a small amount of the synthesis yield for the HMR measurement and to treat the major amount of the yield as described in the following, in particular with regard to heating, calcination and optionally ion exchange.

Known methods to synthesize zeolites comprise the preparation of reaction mixtures comprising a silica source and an alumina source and combining them. The reaction mixtures generally comprise alkali and alkaline earth metal hydroxides and structure directing agents. Instead of using separate silicon and alumina sources, some known processes for the synthesis of zeolites make use of a precursor zeolite such as faujasite, which, in combination with alkali and alkaline earth metal hydroxides and structure directing agents, allows for the synthesis of other zeolites such as chabazite.

A reaction mixture comprising the silicon and alumina sources, at least one alkali and/or alkaline earth metal hydroxide, at least one structure directing agent (SDA) and water is hereinafter referred to as "the gel". Gels suitable to synthesize crystalline aluminosilicate zeolites having a maximum pore size of eight tetrahedral atoms, wherein the zeolite has a total proton content of less than 2 mmol per gram have the following molar composition:

$SiO_2{:}a\ Al_2O_3{:}b\ SDA1{:}c\ Me(OH)_n{:}d\ H_2O,$ wherein
  a ranges between 0.01 and 0.05, preferably between 0.012 and 0.043,
  b ranges between 0.02 and 0.5, preferably between 0.03 and 0.45,
  Me(OH)$_n$ is an alkali or alkaline earth metal hydroxide, wherein
    Me is selected from Li, Na, K, Rb, Cs, Ca, Mg, Sr, Ba and mixtures thereof,
    n=1 for an alkali metal selected from Li, Na, K, Rb, Cs,
    n=2 for an alkaline earth metal selected from Ca, Mg, Sr, Ba, and
    c ranges between 0.1 and 1.2 for n=1, and
    c ranges between 0.05 and 0.6 for n=2, and
    the product c*n ranges between 0.1 and 1.2,
  d ranges between 30 and 70.

The product c*n represents the molar amount of OH groups. It ranges between 0.1 and 1.2, irrespective of whether only alkali metal hydroxides, only alkaline earth metal hydroxides of mixtures of alkali and alkaline earth metal hydroxides are used.

Optionally, the gel may additionally comprise a second SDA, referred to as SDA 2, and/or other organic components such as glycerol, hexamethonium bromide, and/or salts of alkali and/or alkaline earth metals, preferably halides thereof.

The skilled person knows which second SDAs, other organic components and salts of alkali and alkaline earth metals can be used in the synthesis of zeolites. He can make use of this knowledge without departing from the scope of the claims.

The reaction mixtures, i.e. the gels as described above, comprising the silica source, the alumina source or the precursor zeolite are usually stirred and can optionally be aged afterwards. Subsequently, the reaction mixture is heated at temperatures of between 70° C. and 190° C. for 2 hours to 25 days, washed and dried at a temperature of between 60° C. and 80° C. for 8 to 36 hours. In a preferred embodiment, the reaction mixtures comprising the silica source, the alumina source or the precursor zeolite is stirred for 10 to 50 minutes at a temperature of 20 to 40° C., preferably at room temperature (25° C.) under stirring. Subsequently, the reaction mixture is heated at temperatures of between 70° C. and 190° C. for 2 hours to 25 days under dynamic conditions. Afterwards, the zeolite formed is calcined at a temperature of between 400° C. and 850° C. or 4 to 10 hours, preferably at 550° C. to 750° C., even more preferably at 550° C. to 650° C., for 6 to 8 hours. As already mentioned, these methods are known to the skilled person and can be applied without departing from the scope of the claims.

It has to be noted that the crucial factors for obtaining a crystalline aluminosilicate zeolite having a maximum pore size of eight tetrahedral atoms, wherein the zeolite has a total proton content of less than 2 mmol per gram are
  a) a molar ratio of H$_2$O:SiO$_2$ in the gel of between 30 and 70, and
  b) heating the reaction mixture under dynamic conditions as described above.

In a preferred embodiment, the reaction mixture, i.e. the gel, is stirred for 10 to 50 minutes at a temperature of 20 to 40° C. between steps a) and b), i.e. before heating.

As mentioned above, it is well known that alkali, alkaline earth metal and transition metal cations can be removed from or introduced into a zeolite via ion exchange reactions. These ion exchange reactions are exemplarily described hereinafter for the introduction of alkali and alkaline earth metal cations and for transition metal cations, respectively. The skilled person knows how to adapt these ion exchange reactions to obtain a zeolite with a desired cation content. The reactions described also include steps wherein metal cations are removed via the introduction of ammonium cations, followed by thermal decomposition thereof during calcination.

Copper, for instance, can be introduced via ion exchange. In a first step, an ammonium exchange is performed in order to remove alkali or alkaline earth metal cations from the zeolite framework by replacing them with NH$_4^+$ cations. In a second step, NH$_4^+$ is replaced by copper cations. The copper content of the resulting copper-containing small-pore zeolite can be easily controlled via the amount of copper salt and the number of ion exchange procedures performed.

Methods for introducing ammonium and copper cations, respectively, are well known to the skilled artisan. They can be applied to the calcined zeolites according to the present invention without departing from the scope of the claims. For example, ammonium cations can be easily introduced via liquid ion exchange, and copper cations can also easily be introduced via liquid ion exchange, incipient wetness impregnation or solid state ion exchange.

Said methods are presented exemplarily hereinafter. These methods are applicable to obtain zeolites according to the present invention which are loaded a) with transition metals like copper and/or iron and/or b) with alkali and/or alkaline earth metals. If a $^1$H MAS NMR measurement shall be carried out, the ion exchange procedure as described above for the preparation of zeolite samples for said measurements has to be carried out.

Liquid Ion Exchange

An $NH_4^+$ liquid ion exchange can be performed at 100° C. in an aqueous suspension under reflux conditions. 100 ml of a 0.5 M aqueous $NH_4Cl$ or $NH_4NO_3$ solution is used per 1 g of the zeolite.

A $Cu^{2+}$ liquid ion exchange is performed at room temperature for 20 h. 100 ml of an aqueous copper acetate $(Cu(Ac)_2)$, copper nitrate $(Cu(NO_3)_2)$ or copper chloride $(CuCl_2)$ solution per 1 g zeolite is used, corresponding to 0.03 g Cu per 1 g zeolite. This procedure can be repeated multiple times in order to achieve the desired copper content.

It is obvious for the skilled person that the copper to zeolite ratio in liquid ion exchange can be adjusted according to the desired copper content of the final zeolite. Generally spoken, aqueous solutions with higher copper contents yield higher copper-containing zeolites. The skilled person may, for instance, choose aqueous copper salt solutions having a copper content of 0.03 to 0.1 g copper per 1 g zeolite in order to yield copper-containing zeolites according to the present invention, said Cu-containing zeolites having a Cu content of from 0.1 to 10-wt.-%, calculated as CuO and based on the total weight of the zeolite. Which copper concentration per 1 g zeolite should be chosen and how often the procedure shall be repeated can easily be determined by the skilled person without departing from the scope of the claims.

Optionally, the ammonium-exchanged zeolite can be subjected to heat treatment in order to decompose the ammonium ions. Subsequently, the copper exchange can be carried out as described above.

Incipient Wetness Impregnation

An aqueous solution of copper acetate $(Cu(Ac)_2)$, copper nitrate $(Cu(NO_3)_2)$ or copper chloride $(CuCl_2)$ is used in a volume equal to the zeolite pore volume. The amount of copper acetate, chloride or nitrate is equal to the amount of copper preferred in the zeolite. The incipient wetness impregnation is carried out at room temperature. Afterwards, the copper-exchanged zeolite is dried at temperatures between 60 and 70° C. for 8 to 16 hours, and the mixture is subsequently heated to temperatures in the range of 550 to 900° C.

Solid State Ion Exchange

Suitable copper salts are, for instance, copper acetate $(Cu(Ac)_2)$, copper nitrate $(Cu(NO_3)_2)$, copper chloride $(CuCl_2)$, copper(II) oxide (CuO), copper(I) oxide $(Cu_2O)$ and copper acetylacetonate $(Cu(acac)_2)$. The copper salt and the zeolite are mixed in a dry state, and the mixture is subsequently heated to temperatures in the range of 550 to 900° C. A process for producing metal doped zeolites is, for instance, disclosed in US 2013/0251611 A1. This process may be applied to the zeolites of the present invention without departing from the scope of the claims.

Introducing iron into the zeolite can be performed in the same manner as described for the introduction of copper. Suitable salts for an iron ion exchange can be $Fe^{2+}$ or $Fe^{3+}$ salts, preferably $Fe^{3+}$ salts such as $FeCl_3$, $Fe_2(SO_4)_3$, $Fe(NO_3)_3$, and $Fe(Ac)_3$.

Analogously, alkali or alkaline earth metals can be exchanged against one another or against $NH_4^+$. Suitable alkali or alkaline earth metal compounds for introducing these metals are the respective hydroxides, for instance NaOH and KOH. If the amount of alkali or alkaline earth metals shall be reduced, the zeolite is mixed with an aqueous $NH_4Cl$ solution and heated up to the boiling point. The zeolite is recovered by filtration and washing with deionized water and then dried. Repeating this procedure for one or more times further reduces the content of alkali or alkaline earth metal cations. It is also possible to perform an $NH_4^+$ wet ion exchange as described above, followed by a liquid ion exchange with other alkali or alkaline earth metal cations. Suitable alkali or alkaline earth metal salts which can be used in such a liquid ion exchange are well known to the skilled person. They comprise, for instance, the chlorides, bromides nitrates, sulfates and acetates of lithium, sodium, potassium, rubidium, cesium, magnesium, calcium, strontium and barium, depending on the cations shall be introduced into the final zeolite for use in SCR. It is also possible to combine exchange steps for introducing alkali or alkaline earth metals cations and copper cations. If both copper cations and alkali or alkaline earth metal cations shall be introduced, it is possible 1. to introduce the alkali or alkaline earth metal cations first, followed by the introduction of copper cations,
2. to introduce the copper cations first, followed by the introduction of alkali or alkaline earth metal cations, or
3. to introduce alkali or alkaline earth metal cations and copper cations concomitantly.

Which one of the three options to introduce both alkali and alkaline earth metal cations and copper will be chosen depends on where these cations shall be placed within the zeolite and which use of the zeolite thus obtained is intended. The skilled person knows how to find the most suitable of these three options by routine experiments. He can make use of this knowledge without leaving the scope of protection of the claims.

In one embodiment of the present invention, an $NH_4^+$ liquid ion exchange is performed first, followed by a $Cu^{2+}$ and/or $Fe^{3+}$ liquid ion exchange, incipient wetness impregnation or solid state exchange Optionally, an alkali or alkaline earth metal can additionally be introduced, either prior or after the introduction of the at least one transition metal.

In another embodiment, an $NH_4^+$ liquid ion exchange is performed to reduce or to completely remove the concentration of the transition metals, the alkali metals and/or the alkaline earth metals which were introduced into the zeolite during the synthesis, followed by a decomposition of the $NH_4^+$ ions as described above. Furthermore, ion exchange techniques as described above can be used to reduce the concentration of one group of the metal cations, e.g. the alkali or alkaline earth metal cations, and to introduce another group of metal cations, for instance transition metal cations such as $Cu^{2+}$ and/or $Fe^{3+}$ ions, or vice versa.

In general, methods for the synthesis of zeolites comprise the use of compounds of alkali or alkaline earth metals, for instance the use of hydroxides like NaOH or KOH. Furthermore, the methods require the use of structure-directing organic agents, also known as SDAs or OSDAs, which may comprise transition metals, for example the well-known OSDA Cu-tetraethylenepentamine (Cu-TEPA) for the synthesis of chabazite.

Therefore, in one embodiment of the present invention, the at least one transition metal is introduced into the zeolites according to the present invention during the synthesis of said zeolite by an organic structure-directing agent comprising said at least one transition metal. In a preferred embodiment, the organic structure-directing agent is Cu-TEPA, and the zeolite according to the present invention which is synthesized by means of Cu-TEPA is chabazite.

The inventors of the present invention found that there is a strong correlation between the total proton content of the calcined dry proton form of the zeolites and their hydrothermal stability when they comprise a transition metal, for instance Cu and/or Fe, afterwards. If the total proton content of the calcined dry proton form of the zeolite as defined above, i.e. the area of the $^1$H MAS NMR spectrum between 20 and −8 ppm, is less than 2 mmol/g, then the corresponding copper- and/or iron-loaded zeolite is hydrothermally stable. The "hydrothermal stability" of a zeolite is its ability to withstand a hot, watercontaining atmosphere without decomposing over a certain period of time. It is well-known that the measurement of the hydrothermal stability can take place at different temperatures and water contents and over different time periods. Typical measurements of the hydrothermal stability of zeolites take place at temperatures of about 600° C. to 900° C. in air with a water content of 10 to 15 vol.-% $H_2O$ for 1 to 5 hours. The zeolites according to the present invention show hydrothermal stabilities of at least 700° C., treated over 2 to 4 hours in an air atmosphere comprising 10 to 15 vol.-% of $H_2O$.

In one embodiment of the present invention, the silica to alumina molar ratio ($SiO_2/Al_2O_3$) of the zeolites according to the present invention ranges from 5 to 50, preferably 12 to 30. Hereinafter, the silica to alumina molar ratio is abbreviated as SAR.

In one embodiment of the present invention, the zeolites according to the present invention comprise at least one transition metal to a concentration of 0.1 to 10 wt.-%, calculated as the respective oxides and based on the total weight of the zeolite. The at least one transition metal is chosen from the elements of the groups 33 to 12 of the periodic table. Preferably, the at least one transition metal is chosen from copper, iron and mixtures thereof; even more preferably, the at least one transition metal is copper. In this case, the transition metal content is calculated as CuO or $Fe_2O_3$, respectively. In one embodiment, the at least one transition metal is present in amount of 0.1 to 10 wt.-%, calculated as the respective metal oxides and based on the total weight of the zeolite, preferably 0.5 to 6 wt.-% and most preferably 0.7 to 4.5 wt.-% In one embodiment, the at least one transition metal is introduced during the synthesis of the respective zeolite, for instance by an OSDA comprising a transition metal cation.

In this case, the transition metal content of the zeolite obtained after calcination can be adjusted according to the intended use of the zeolite. "Adjusting" means that the transition metal content can be left unaffected, or a part of the at least one transition metals can be removed by ion exchange, or additional transition metal can be introduced into the zeolite.

In another embodiment, the at least one transition metal is introduced after the synthesis of the zeolite. In this case, the loading with the at least one transition metal is preferably carried out on the zeolites obtained after the calcination step.

In one embodiment of the present inventions, the zeolites of the present invention comprise at least one alkali or alkaline earth metal in a concentration of 0 to 2 wt.-%, preferably 0.001 to 0.5 wt.-%, calculated as the pure metals and based on the total weight of the zeolite.

In a preferred embodiment, the at least one alkali or alkaline earth metal is introduced during the synthesis of the respective zeolite, for instance by an alkali or alkaline earth metal hydroxide, an alkali metal silicate, an alkali metal aluminate, and the like. In this case, it is preferred not to introduce additional alkali or alkaline earth metals. Compounds that can be used in the synthesis of zeolites and that comprise alkali and/or alkaline earth metals are known to the skilled person. They can be used without departing from the scope of the claims.

In an alternative embodiment, alkali and/or alkaline earth metals can be introduced after the synthesis of the zeolite via ion exchange methods as described above.

In case alkali and/or alkaline earth metals shall be introduced, the introduction of the at least one alkali or alkaline earth metal cation can be carried out after, before or concomitantly with the introduction of the at least one transition metal cation as explained above. The skilled person knows which alkali or alkaline earth metal salts are suitable for the introduction of the respective cations via ion exchange. He can make use of this knowledge without departing from the scope of the claims.

The at least one alkali or alkaline earth metal is selected from lithium, sodium, potassium, rubidium, cesium, magnesium, calcium, strontium and barium. In a preferred embodiment, the alkali or alkaline earth metal is selected from sodium, potassium and mixtures thereof. More preferably, the alkali metal is potassium.

In one embodiment of the present invention, the zeolites according to the present invention comprise at least one transition metal which may be introduced either during the synthesis or via ion exchange as described above. The transition metal to aluminum atomic ratio is in the range of between 0.003 to 0.5. The transition metal is preferably selected from copper, iron and mixtures thereof as described above. The skilled person knows how to adjust the amount of transition metal which is introduced via ion exchange to yield the desired transition metal to aluminum ratio. He can make use of this knowledge without departing from the scope of the claims.

In one embodiment of the present invention, the zeolites have a mean crystal size and/or a D90 crystal size of 0.3 to 7 μm, such as 0.5 to 2.5 μm or 2.5 to 5 μm. The crystal size is based on individual crystals (including twinned crystals) but does not include agglomerations of crystals. Crystal size is the length of longest diagonal of the three dimensional crystal. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the arithmetic mean of the sample crystal sizes is calculated.

The zeolites according to the present invention can be used in a process for the removal of NON from automotive combustion exhaust gases. In this process, also known as SCR (selective catalytic reduction), these zeolites are used as the catalytically active materials for the conversion of NON. The conversion of NON is particularly necessary during lean burn operation of internal combustion engines.

Therefore, the use of the zeolites according to the present invention as the catalytically active material for the conversion of NOx is applicable in both diesel and gasoline engines, in particular when a DeNO$_x$ activity under lean burn operation is needed.

Zeolites which are used as SCR catalytically active materials require the presence of at least one transition metal, in particular the presence of copper and/or iron to enable the SCR reaction to happen in the first place.

As mentioned above, the zeolites according to the present invention can be used for the preparation of SCR catalysts. Furthermore, they are suitable ion exchangers. They can also be used as molecular sieves and as catalysts in a large variety of reactions. Well-known uses of zeolites include, for instance, fluid catalytic cracking, hydrocracking, hydrocarbon conversion reactions, reprocessing methods and heat accumulation.

In the present invention, a "catalyst" or "catalytic system" refers to a component of an exhaust purification system comprising a catalytically active material and a carrier, a housing or the like. Such catalytic systems are often referred to as "monoliths". The catalytically active material is the chemical compound or mixture of compounds which effects the conversion of harmful exhaust gases into non-hazardous gases. An SCR catalytically active material, for instance, converts NO into $N_2$ and $H_2O$.

Hereinafter, the following abbreviations are used for catalysts used in automotive exhaust purification systems, mainly lean burn engines:

| | |
|---|---|
| SCR | Catalyst for selective catalytic reduction |
| DOC | Diesel oxidation catalyst |
| DPF | Diesel particulate filter |
| SDPF | Diesel particulate filter (DPF) coated with an SCR catalyst |
| CDPF | Catalysed Diesel particulate filter = DPF coated with a DOC |
| LNT | Lean NO$_x$ trap |
| ASC | ammonia slip catalyst |
| PNA | Passive NO$_x$ adsorption catalyst |

These catalytic systems, i.e. the SCR, the DOC, the DPF, the SDPF, the CDPF, the LNT, the PNA and the ASC can, independently from one another, be composed of one or more monoliths having different dimensions and forms.

In one embodiment of the present invention, a catalysed substrate monolith comprises an SCR catalytically active material for the conversion of NO for use in treating automotive combustion exhaust gases, wherein said SCR catalytically active material for the conversion of NO is a zeolite according to the present invention.

Exhaust emissions of vehicles driven by a predominantly lean combustion engine contain, in addition to particle emission, in particular the primary emissions carbon monoxide CO, hydrocarbons HC, and nitrogen oxides NON. Due to the relatively high oxygen content of up to 15 vol. %, carbon monoxide and hydrocarbons can be rendered harmless by oxidation fairly easy, but the reduction of the nitrogen oxides to nitrogen is much more difficult to achieve.

The SCR catalytically active materials may, for instance, be obtained by solid state sublimation. For this purpose, a dry, intimate mixture of the zeolite and a transition metal salt, preferably a copper or iron salt or a mixture of copper and iron salts, as described above under "solid state ion exchange" is made. Said mixture is then heated to a temperature of 550 to 900° C., whereby the transition metal salt decomposes into the metal (e.g. copper or iron) or the metal ion (e.g. the copper or iron ion). Subsequently, the mixture is heated at a temperature and for a time span sufficient to achieve the solid state sublimation of copper into the respective zeolite framework type material.

The powder thus obtained is then dispersed in water and mixed with a binder. Suitable binders are based on the oxides of Al, Zr, Ti or Si, e.g. boehmite and silica gel. Afterwards, this mixture comprising water, a binder, and the stable small-pore zeolite material only needs to be stirred or homogenized, respectively, and may be applied directly as a coating suspension to coat a carrier substrate. The coating suspension is hereinafter referred to as the "washcoat".

In an alternative embodiment, the SCR catalytically active materials according to the present invention may be manufactured by adding a water-soluble transition metal salt, preferably a copper or iron salt or a mixture thereof, as described above under "liquid ion exchange", to water followed by adding this salt solution to the zeolite powder. A particularly suitable copper salt is copper acetate. After this liquid ion exchange, the transition containing zeolite framework type material thus obtained is then dispersed in water and mixed with a binder to form a washcoat as described above.

Typically, the washcoat loading on a carrier substrate is in the range of between 120 and 250 g/l.

In some embodiments of the SCR catalytically active materials according to the present invention, said SCR catalyst is present in the form of a coating on a carrier substrate, i.e. as a washcoat on a carrier substrate. Carrier substrates can be so-called flow-through substrates or wall-flow filters, respectively.

Both carrier substrates may consist of inert materials, such as silicon carbide, aluminum titanate, cordierite, metal or metal alloys. Such carrier substrates are well-known to the skilled person and available on the market.

In other embodiments, the carrier substrates may be catalytically active on their own, and they may comprise catalytically active material, e.g. SCR-catalytically active material. SCR-catalytically active materials which are suitable for this purpose are basically all materials known to the skilled person, for example catalytically active materials based on mixed oxides, or catalytically active materials based on copper-exchanged, zeolitic compounds. Mixed oxides comprising compounds of vanadium, titanium and tungsten are particularly suitable for this purpose.

In addition to the catalytically active material, these carrier substrates comprise a matrix component. All inert materials which are otherwise used for the manufacturing of catalyst substrates may be used as matrix components in this context. It deals, for instance, with silicates, oxides, nitrides or carbides, with magnesium aluminum silicates being particularly preferred.

In other embodiments of the SCR catalysts according to the present invention, the catalyst itself forms part of the carrier substrate, for example as part of a flow-through substrate or a wall-flow filter. Such carrier substrates additionally comprise the matrix components described above.

Carrier substrates comprising the SCR catalytically active materials according to the present invention may be used as such in exhaust purification. Alternatively, they may be coated with catalytically active materials, for example with SCR-catalytically active materials. Insofar as these materials shall exhibit an SCR catalytic activity, the SCR catalytically active materials mentioned above are suitable materials.

In one embodiment, catalytically active carrier materials are manufactured by mixing 10 to 95 wt.-% of at least one inert matrix component and 5 to 90 wt.-% of a catalytically active material, followed by extruding the mixture according to well-known protocols. As already described above, inert materials that are usually used for the manufacture of catalyst substrates may be used as the matrix components in this embodiment. Suitable inert matrix materials are, for example, silicates, oxides, nitrides and carbides, with magnesium aluminum silicates being particularly preferred. Catalytically active carrier materials obtainable by such processes are known as "extruded catalysed substrate monoliths".

The application of the catalytically active catalyst onto either the inert carrier substrate or onto a carrier substrate which is catalytically active on its own as well as the application of a catalytically active coating onto a carrier substrate, said carrier substrate cornprising a catalyst according to the present invention, can be carried out following manufacturing processes well known to the person skilled in the art, for instance by widely used dip coating, pump coating and suction coating, followed by subsequent thermal post-treatment (calcination).

The skilled person knows that in the case of wall-flow filters, their average pore sizes and the mean particle size of the catalysts according to the present invention may be adjusted to one another in a manner that the coating thus obtained is located onto the porous walls which form the channels of the wall-flow filter (on-wall coating). However, the average pore sizes and the mean particle sizes are preferably adjusted to one another in a manner that the catalyst according to the present invention is located within the porous walls which form the channels of the wall-flow filter. In this preferable embodiment, the inner surfaces of the pores are coated (in-wall coating). In this case, the mean particle size of the catalysts according to the present invention has to be sufficiently small to be able to penetrate the pores of the wall-flow filter.

The catalysts according to the present invention may advantageously be used for the exhaust purification of lean combustion engines, in particular for diesel engines. They convert nitrogen oxides comprised in the exhaust gas into the harmless compounds nitrogen and water.

Commonly known exhaust gas purification systems for diesel engines are often formed by arranging an oxidation catalyst (DOC) having an oxidative function for carbon monoxide and hydrocarbons and optionally nitrogen monoxide and aforementioned selective catalytic reduction type catalyst (SCR), in a flow path of exhaust gas, characterized in that a spraying means to supply an urea aqueous solution or an aqueous ammonia solution or gaseous ammonia is arranged downstream of the aforementioned oxidation catalyst and upstream of aforementioned selective catalytic reduction type catalyst. The skilled person knows that the DOC catalyst might also be replaced by a passive $NO_x$ adsorber catalyst (PNA) or $NO_x$ storage catalyst (NSC) which is able to store $NO_x$ from the exhaust gas at lower temperatures and to desorb the $NO_x$ thermally at higher temperatures (PNA) or reduce the $NO_x$ directly by means of a reductant like rich exhaust gas (Lambda<1) or other reducing agents like fuel (NSC), respectively. The PNA or NSC catalysts preferably also contain catalytic functions for the oxidation of carbon monoxide and hydrocarbons as well as optionally the oxidation of nitrogen monoxide. Furthermore, a diesel particulate filter (DPF) for filtering out soot is often arranged in the system together with the DOC (or NSC) catalyst and the SCR catalyst. In these arrangements, combustible particle components are deposited on the DPF and combusted therein. Such arrangements are, for instance, disclosed in EP 1 992 409 A1. Widely used arrangements of such catalysts are, for example (from upstream to downstream):

$$DOC+(NH_3)+SCR \qquad (1)$$

$$DOC+DPF+(NH_3)+SCR \qquad (2)$$

$$DOC+(NH_3)+SCR+DPF \qquad (3)$$

$$DOC+(NH_3)+SCR+DOC+DPF \qquad (4)$$

$$DOC+(NH_3)+SDPF+(NH_3\ opt.)+SCR \qquad (5)$$

$$DOC+CDPF+(NH_3)+SCR \qquad (6)$$

$$(NH_3)+SCR+DOC+CDPF(NH_3\ opt.)+SCR \qquad (7)$$

$$(NH_3)+SCR+DOC+SDPF+(NH_3\ opt.)+SCR \qquad (8)$$

$$(NH_3)+SCR+ASC \qquad (9)$$

$$DOC+(NH_3)+SCR+SDPF+(NH_3\ opt.)+SCR \qquad (10)$$

$$DOC+(NH_3)+SDPF+SCR+(NH_3\ opt.)+SCR \qquad (11)$$

In the above examples (1) to (11), ($NH_3$) represents a position where an urea aqueous solution, an aqueous ammonia solution, ammonium carbamate, ammonium formiate or another reducing agent reducing $NO_x$ via the SCR reaction selectively is supplied as a reducing agent by spraying. The supply of such urea or ammonia compounds in automotive exhaust gas purification systems is well known in the art. ($NH_3$ opt.) in examples 5, 7, 8, 10 and 11 means that said second source of urea or ammonia compounds is optional. The catalysts containing the high thermal stable zeolites according to the present invention are preferably positioned close to the engine or close to the DPF, since here the temperatures are highest in the system. Preferably the zeolite materials of the present invention are used on the SDPF or catalysts closely positioned to the filter like in system 10 and 11 where one SCR catalyst is located directly upstream or downstream the SDPF, respectively without additional $NH_3$ dosing in-between these two catalysts. Also the first SCR catalyst of systems 7 to 9 which is close coupled to the engine is a preferred embodiment of the present invention.

Hence, the present invention furthermore refers to a method for the purification of exhaust gases of lean combustion engines, characterized in that the exhaust gas is passed over a catalyst according to the present invention. Lean combustion engines are diesel engines, which are generally operated under oxygen rich combustion conditions, but also gasoline engines which are partly operated under lean (i.e. oxygen rich atmosphere with Lambda>1) combustion conditions. Such gasoline engines are, for instance, lean GDI engines or gasoline engines which are using the lean operation only in certain operation points of the engine like cold start or during fuel cut events. Due to the high thermal stability of the zeolites according to the present invention these zeolites might also be used in exhaust systems of gasoline engines. In this case a PNA, SCR or ASC catalyst according to the present invention might be arranged in combination with aftertreatment components typically used to clean exhaust emissions from gasoline engines like three way catalysts (TWC) or gasoline particulate filters (GPF). In these cases, the above mentioned system lay outs 1-11 are modified by replacing the DOC catalyst by a TWC catalyst and the DPF or CDPF by a GPF. In all those systems the dosing of ammonia is optional since gasoline engines are able to produce ammonia in situ during operation over the TWC catalyst so that the injection of aqueous urea or ammonia or another ammonia precursor upstream of the SCR catalyst might not be needed. In case a PNA is used in those systems, the PNA will preferably be located as a first catalyst in the system close to the engine to have an early heat up. The PNA might also be located in an underfloor position to prevent thermal damage of the catalyst. In these positions the exhaust temperatures can be controlled in order to not exceed 900° C.

In a preferred embodiment of the process according to the present invention, ammonia is used as the reducing agent. The ammonia required may, for instance, be formed within the exhaust purification system upstream to a particulate filter by means of an upstream nitrogen oxide storage catalyst ("lean $NO_x$ trap"—LNT). This method is known as "passive SCR".

Alternatively, ammonia may be supplied in an appropriate form, for instance in the form of urea, ammonium carbamate or ammonium formiate, and added to the exhaust gas stream as needed. A widespread method is to carry along an aqueous urea solution and to and to dose it into the catalyst according to the present invention via an upstream injector as required.

The present invention thus also refers to a system for the purification of exhaust gases emitted from lean combustion engines, characterized in that it comprises a catalyst according to the present invention, preferably in the form of a coating on a carrier substrate or as a component of a carrier substrate, and an injector for aqueous urea solutions, wherein the injector is located upstream of the catalyst of the present invention.

For example, it is known from SAE-2001-01-3625 that the SCR reaction with ammonia proceeds more rapidly if the nitrogen oxides are present in a 1:1 mixture of nitrogen monoxide and nitrogen dioxide, or if the ratios of both nitrogen oxides are close to 1:1. As the exhaust gas from lean combustion engines generally contains an excess of nitrogen monoxide over nitrogen dioxide, this SAE paper suggest to increase the amount of nitrogen dioxide by means of an oxidation catalyst. The exhaust gas purification process according to the present invention may not only be applied in the standard SCR reaction, i.e. in the absence of nitrogen oxide, but also in the rapid SCR reaction, i.e. when part of the nitrogen monoxide has been oxidized to nitrogen dioxide, thus ideally providing a 1:1 mixture of nitrogen monoxide and nitrogen dioxide.

The present invention therefore also relates to a system for the purification of exhaust gases from lean combustion engines, characterized in that it comprises an oxidation catalyst, an injector for aqueous urea solutions and a catalyst according to the present invention, preferably in the form of a coating on a carrier substrate or as a component of a carrier substrate.

In a preferred embodiment of the exhaust gas purification system according to the present invention, platinum supported on a carrier support material is used as an oxidation catalyst.

Any carrier material for platinum and/or palladium which is known to the skilled person as suitable material may be used without departing from the scope of the claims. Said materials show a BET surface area of 30 to 250 $m^2/g$, preferably 50 to 200 $m^2/g$ (measured according to DIN 66132). Preferred carrier substrate materials are alumina, silica, magnesium dioxide, titania, zirconia, ceria and mixtures and mixed oxides comprising at least two of these oxides. Particularly preferred materials are alumina and alumina/silica mixed oxides. If alumina is used, it is preferably stabilized, for instance with lanthanum oxide.

The exhaust gas purification system is arranged in an order wherein, in flow direction of the exhaust gas purification system, an oxidation catalyst is arranged first, followed by an injector for an aqueous urea solution, and finally a catalyst according to the present invention.

The skilled person knows that the exhaust gas purification system may comprise additional catalysts. A particulate filter may, for instance, be coupled with either the DOC, thus forming a CDPF, or with an SCR, thus forming an SDPF.

In on embodiment of the present invention, the exhaust gas purification system comprises a particulate filter coated with an SCR catalyst, wherein the SCR catalytically active material is a crystalline aluminosilicate zeolite according to the present invention.

The crystalline aluminosilicate zeolite according to the present invention can be coated into the walls of the filter (wall flow substrate) or on the surface of the filter walls. Also a combination of in-wall-coating and on-wall-coating is possible. The wall flow filter can be coated over the whole length of the filter or only partly from the inlet or from the outlet with the zeolite according to the present invention. Methods to apply a zeolite on such a filter are disclosed in WO 2017/178576 A1, WO 2018/029330 A1 and WO 2018/054928 A1. These methods are incorporated by reference.

Furthermore, the exhaust gas purification system may comprise a PNA. The PNA is a $NO_x$ storage device that adsorbs $NO_x$ at low temperatures. Once the exhaust temperatures increases, the stored $NO_x$ is released and reduced to nitrogen over a downstream catalyst, i.e. an SCR catalyst using ammonia, usually in the form of an aqueous urea solution, or an active, barium-based NSC. An NSC is a $NO_x$ storage catalyst.

In some PNA type catalysts, a combination of precious metals and zeolites is used for $NO_x$ trapping. The precious metal is a platinum group metal selected from ruthenium, rhodium, palladium, osmium, iridium, platinum and mixtures thereof. Preferably, the precious metal is chosen from palladium, platinum and mixtures thereof, more preferably, the precious metal is palladium. The total amount of the platinum group metal or the mixture is present in a concentration of 0.01 to 10 wt.-%, preferably 0.05 to 5 wt.-%, even more preferably 0.1 to 3 wt.-%, calculated as the respective platinum group metal and based on the total weight of the zeolite. In a preferred embodiment, the platinum group metal is palladium, and it is present in a concentration of 0.5 to 5 wt.-%, calculated as Pd and based on the total weight of the zeolite. In such a PNAs, the $NO_x$ trapping efficiency is influenced by the nuclearity and the oxidation state of Pd. The dispersion and lower oxidation states of Pd facilitate $NO_x$ adsorption. The $NO_x$ release temperature is dependent on the zeolite structure and is higher for small pore zeolites and lowest for large pore zeolites.

In one embodiment of the present invention, the exhaust purification system comprises a PNA catalyst, wherein the PNA catalytically active material comprises a crystalline aluminosilicate zeolite according to the present invention and at least one precious metal selected from palladium, platinum, and mixtures thereof.

The platinum group metals may be introduced into the PNA via ion exchange of suitable PGM precursor salts as described above or via incipient wetness impregnation treatment of the zeolite or via injection of a PGM salt solution into an aqueous washcoat slurry. The skilled person knows that suitable precious metal precursor salts are the nitrates, acetates, sulfates and amine type complexes of the respective precious metals. He can apply this knowledge without departing from the scope of the claims.

The exhaust gas purification system may furthermore comprise an ammonia oxidation catalyst (ASC). It is well known to the skilled person that an ASC is preferably located downstream of the SCR, because recognizable amounts of $NH_3$ leave the SCR due to the dynamic driving conditions. Therefore, the conversion of excess ammonia which leaves the SCR is mandatory, since ammonia is also an emission regulated gas. Oxidation of ammonia leads to the formation of NO as main product, which would consequently contribute negatively to the total conversion of $NO_x$ of the whole exhaust system. An ASC may thus be located downstream the SCR to mitigate the emission of additional NO. The ASC catalyst combines the key $NH_3$ oxidation function with an SCR function. Ammonia entering the ASC is partially oxidized to NO. The freshly oxidized NO and $NH_3$ inside the ASC, not yet oxidized, can consequently react to $N_2$ following the usual SCR reaction schemes. In doing so, the ASC is capable of eliminating the traces of ammonia by converting them in a parallel mechanism to $N_2$.

In one embodiment of the present invention, the exhaust purification system comprises an ASC catalyst, wherein the ASC catalytically active material comprises a crystalline aluminosilicate zeolite according to the present invention and at least one platinum group metal selected from platinum, palladium and mixtures thereof.

Platinum group metals are used as oxidation catalysts in an ASC, and zeolites may be used for the SCR function. The precious metal is a platinum group metal selected from ruthenium, rhodium, palladium, osmium, iridium, platinum and mixtures thereof. Preferably, the precious metal is chosen from palladium, platinum, rhodium and mixtures thereof, more preferably, the precious metal is platinum. In a preferred embodiment, the platinum group metal is added in the form of a precursor salt to a washcoat slurry and applied to the carrier monolith. The platinum group metal is present in a concentration of 0.01 to 10 wt.-%, preferably 0.05 to 5 wt.-%, even more preferably 0.1 to 3 wt.-%, calculated as the respective platinum group metal and based on the total weight of the washcoat loading. In a preferred embodiment, the platinum group metal is platinum, and it is present in a concentration of 0.1 to 1 wt.-%, calculated as Pt and based on the total weight of washcoat loading.

BRIEF DESCRIPTION OF THE DRAWINGS

The FIGS. 1 to 16 show SEM images of the embodiments. The following abbreviations are used:
HV=high vacuum
CBS=concentric backscatter detector
WD=working distance
mag=magnification
HFW=horizontal field width
In all embodiments, a CBS was used as the detector.

Figure 1:
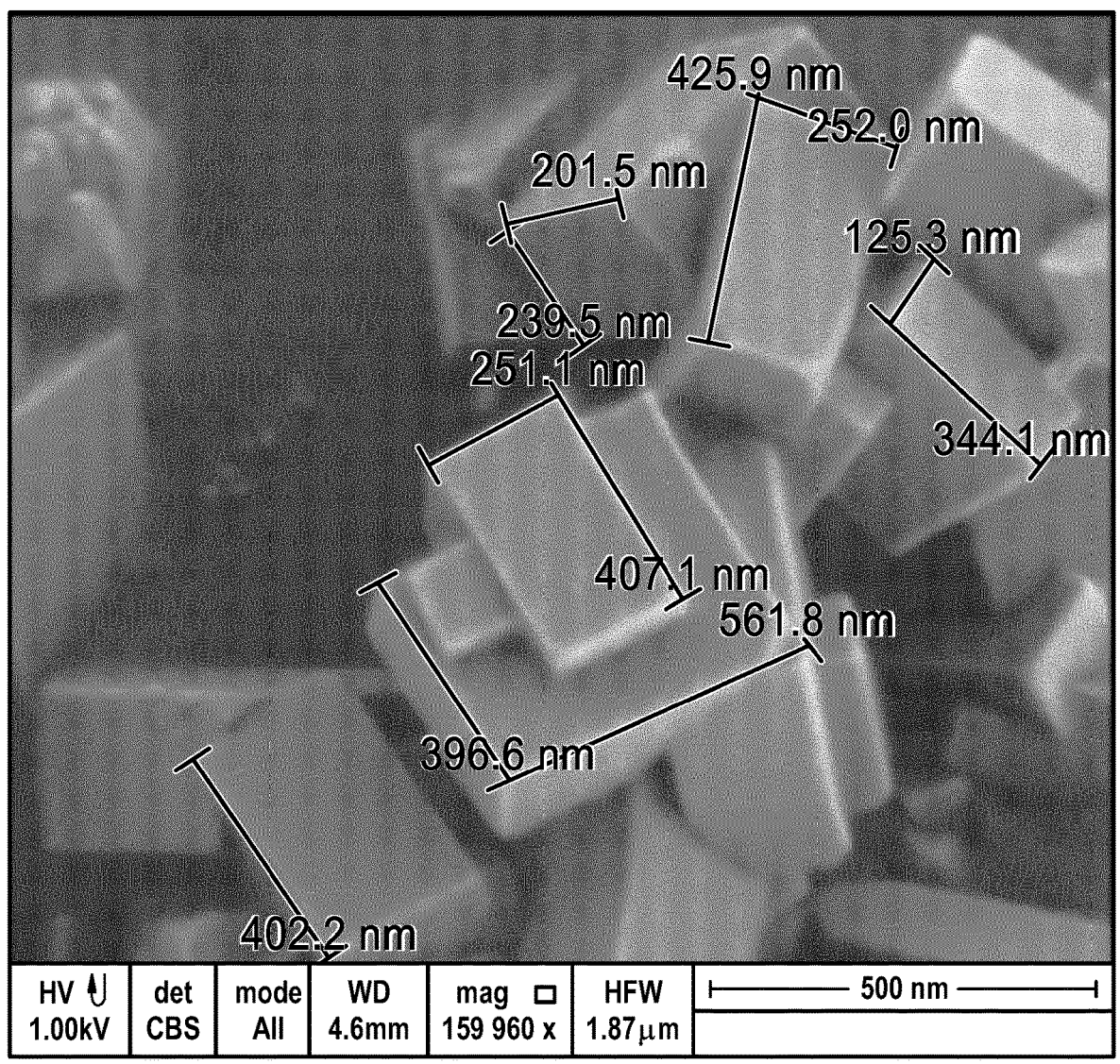
FIG. 1:
SEM image of embodiment 1: AEI zeolite (GV 116)
Maximum hydrothermal stability: 800° C.
HV: 1.00 kV
WD: 4.6 mm
Mag: 159 960×
HFW: 1.87 μm

SEM image of embodiment 13: ETL zeolite (SK120)
Maximum hydrothermal stability: 850° C.
 HV: 1.00 kV
 WD: 4.7 mm
 Mag: 79 996×
FIG. 14:

SEM image of embodiment 16: KFI zeolite (GV009)
Maximum hydrothermal stability: 800° C.
 HV: 1.00 kV
 WD: 5.4 mm
 Mag: 28 775×
 HFW: 10.4 μm
FIG. 15:

SEM image of embodiment 17: UFI zeolite (GV051)
Maximum hydrothermal stability: 800° C.
 HV: 2.00 kV
 WD: 3.9 mm
 Mag: 100 000×
 HFW: 2.98 μm
FIG. 16:

SEM image of embodiment 18: AFX zeolite (SPSS076)
Maximum hydrothermal stability: 800° C.
 HV: 2.00 kV
 WD: 5.2 mm
 Mag: 100 000×
 HFW: 2.98 μm
FIG. 17:

Hydrothermal stability versus the proton content for embodiments 1 to 18.

FIG. 18:

Silanol protons (Si—OH) and hydrothermal stability of the Embodiments 1 to 18.

FIG. 19

Aluminol protons (Al—OH) and hydrothermal stability of the Embodiments 1 to 18.

FIG. 20

Bronsted acid sites (BAS) and hydrothermal stability of the Embodiments 1 to 18.

EMBODIMENTS

Embodiment 1: Synthesis of AEI Zeolite (GV116)

A synthesis gel with composition 37.1 $SiO_2$: 1 $Al_2O_3$: 5.6 SDA:32.2 NaOH:1115 $H_2O$ was prepared by mixing 19.48 g of N,N-dimethyl, 3,5-dimethylpiperidinium hydroxide (18 wt % in $H_2O$) with 2.21 g NaOH pellets, 44.38 g deionized $H_2O$, 27.51 g sodiumsilicate (Merck, 7.5-8.5 wt % $Na_2O$, 25.5-28.5 wt % $SiO_2$) and 2.19 g CBV-500 (Zeolyst) upon stirring. The gel was stirred at room temperature for 20 minutes, and then heated at 135° C. for 7 days under static conditions. The solid product was recovered by filtration and washing with deionized water, and was dried at 60° C. for 16 h. The zeolite produced has an AEI framework type with a SAR of 12.3.

The SEM image of embodiment 1 is shown in FIG. 1.

Embodiment 2: Synthesis of AEI Zeolite (MD155))

A synthesis gel with composition 79.4 $SiO_2$: 1 $Al_2O_3$: 13.8 SDA:44 NaOH:2216 $H_2O$ was prepared by mixing 24.1 g of N,N-dimethyl, 3,5-dimethylpiperidinium hydroxide (18 wt % in $H_2O$) with 0.128 g NaOH pellets, 37.8 g deionized $H_2O$, 32.5 g sodiumsilicate (Merck, 7.5-8.5 wt % $Na_2O$, 25.5-28.5 wt % $SiO_2$) and 1.11 g CBV-500 (Zeolyst) upon stirring. The gel was stirred at room temperature for 20 minutes, and then heated at 135° C. for 7 days under static conditions. The solid product was recovered by filtration and washing with deionized water, and was dried at 60° C. for 16 h. The zeolite produced has an AEI framework type with a SAR of 15.6.

Figure 2:
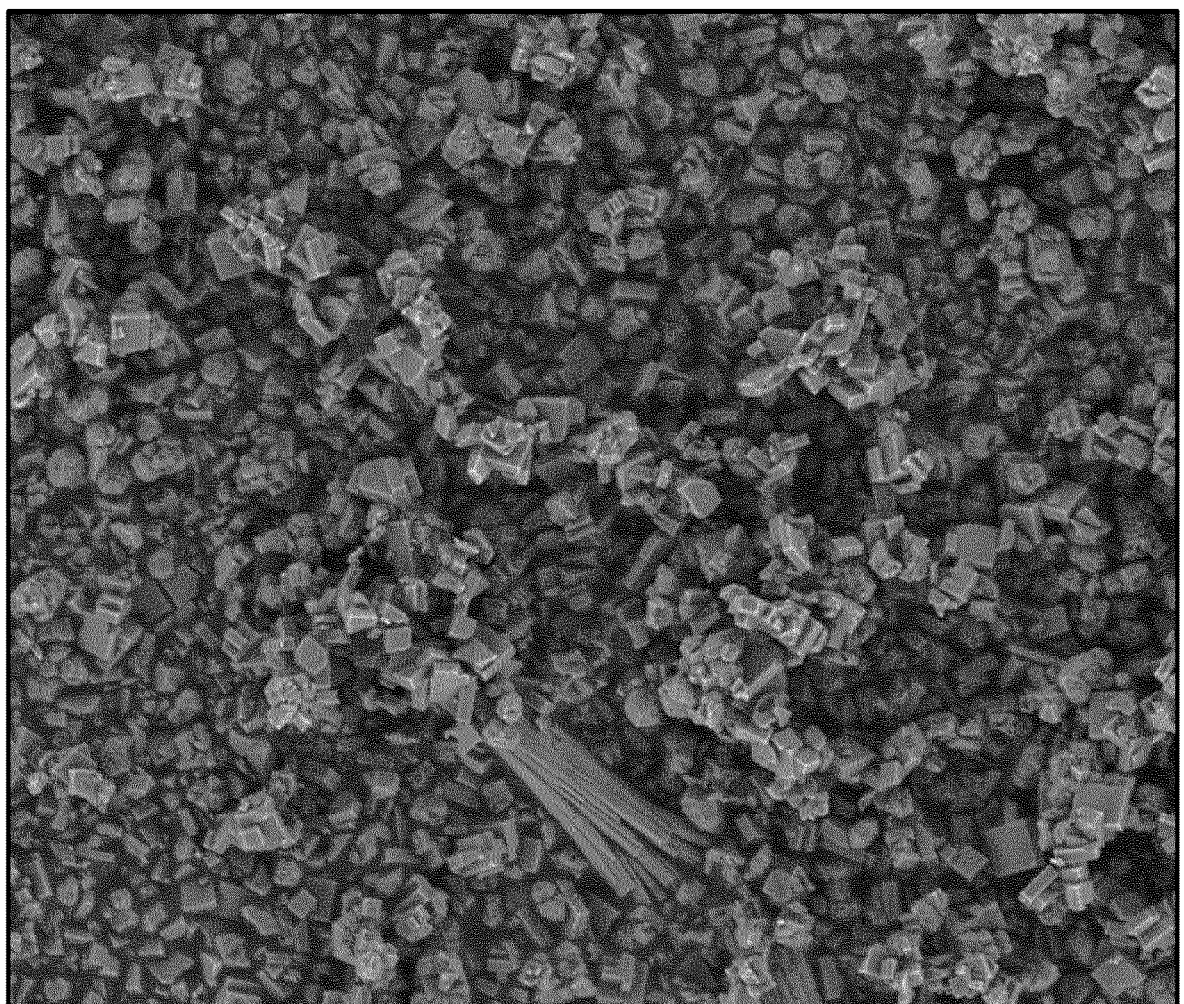
FIG. 2:
SEM image of embodiment 2: AEI zeolite (MD155)
Maximum hydrothermal stability: 850° C.
HV: 2.00 kV
WD: 4.5 mm
Mag: 12 000×
HFW: 24.9 μm

The SEM image of embodiment 2 is shown in FIG. 2.

Embodiment 3: Synthesis of AEI Zeolite (GV191)

A synthesis gel with composition 79.4 $SiO_2$:1 $Al_2O_3$:13.8 SDA:44.1 NaOH:3835 $H_2O$ was prepared by mixing 13.02 g of N,N-dimethyl,3,5-dimethylpiperidinium hydroxide (20.46 wt % in $H_2O$) with 0.079 g NaOH pellets, 60.49 g deionized $H_2O$, 20 g sodiumsilicate (Merck, 7.5-8.5 wt % $Na_2O$, 25.5-28.5 wt % $SiO_2$) and 0.684 g CBV-500 (Zeolyst) upon stirring. The gel was stirred at room temperature for 20 minutes, and then heated at 135° C. for 7 days under static conditions. The solid product was recovered by filtration and washing with deionized water, and was dried at 60° C. for 16 h. The zeolite produced has an AEI framework type with a SAR of 17.

Figure 3:
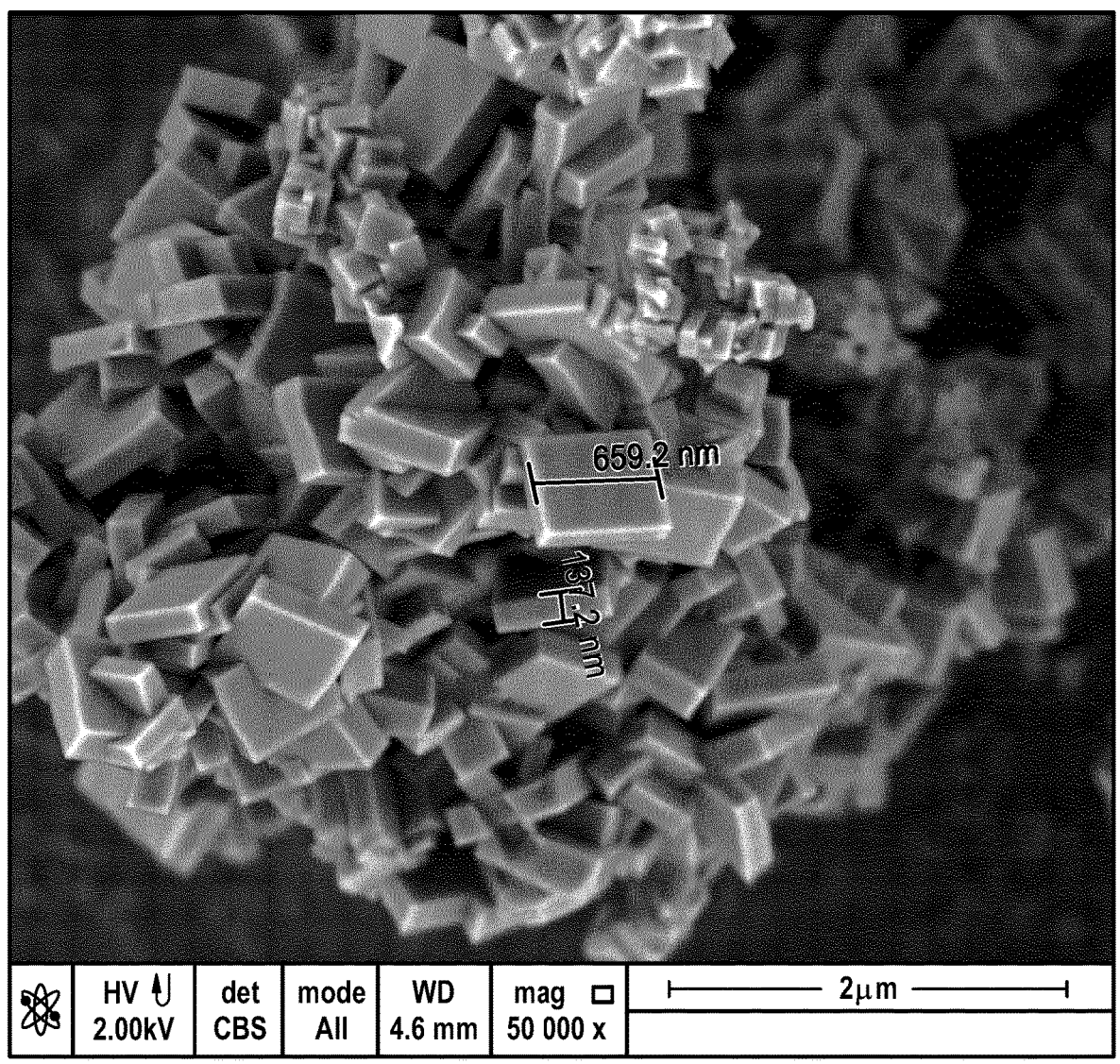
FIG. 3:
SEM image of embodiment 3: AEI zeolite (GV191)
Maximum hydrothermal stability: 900° C.
HV: 2.00 kV
WD: 4.6 mm
Mag: 50 000×

The SEM image of embodiment 3 is shown in FIG. 3.

Embodiment 4: Synthesis of AEI Zeolite (GV198)

A synthesis gel with composition 79.4 $SiO_2$:1 $Al_2O_3$:13.8 SDA:44.1 NaOH:148 glycerol:3835 $H_2O$ was prepared by mixing 13.02 g of N,N-dimethyl,3,5-dimethylpiperidinium hydroxide (20.46 wt % in $H_2O$) with 0.079 g NaOH pellets, 60.49 g deionized $H_2O$, 20 g sodiumsilicate (Merck, 7.5-8.5 wt % $Na_2O$, 25.5-28.5 wt % $SiO_2$), 0.684 g CBV-500 (Zeolyst) and 16.5 g glycerol (Sigma-Aldrich) upon stirring. The gel was stirred at room temperature for 20 minutes, and then heated at 135° C. for 7 days under static conditions.

The solid product was recovered by filtration and washing with deionized water, and was dried at 60° C. for 16 h. The zeolite produced has an AEI framework type with a SAR of 18.7.

Figure 4:
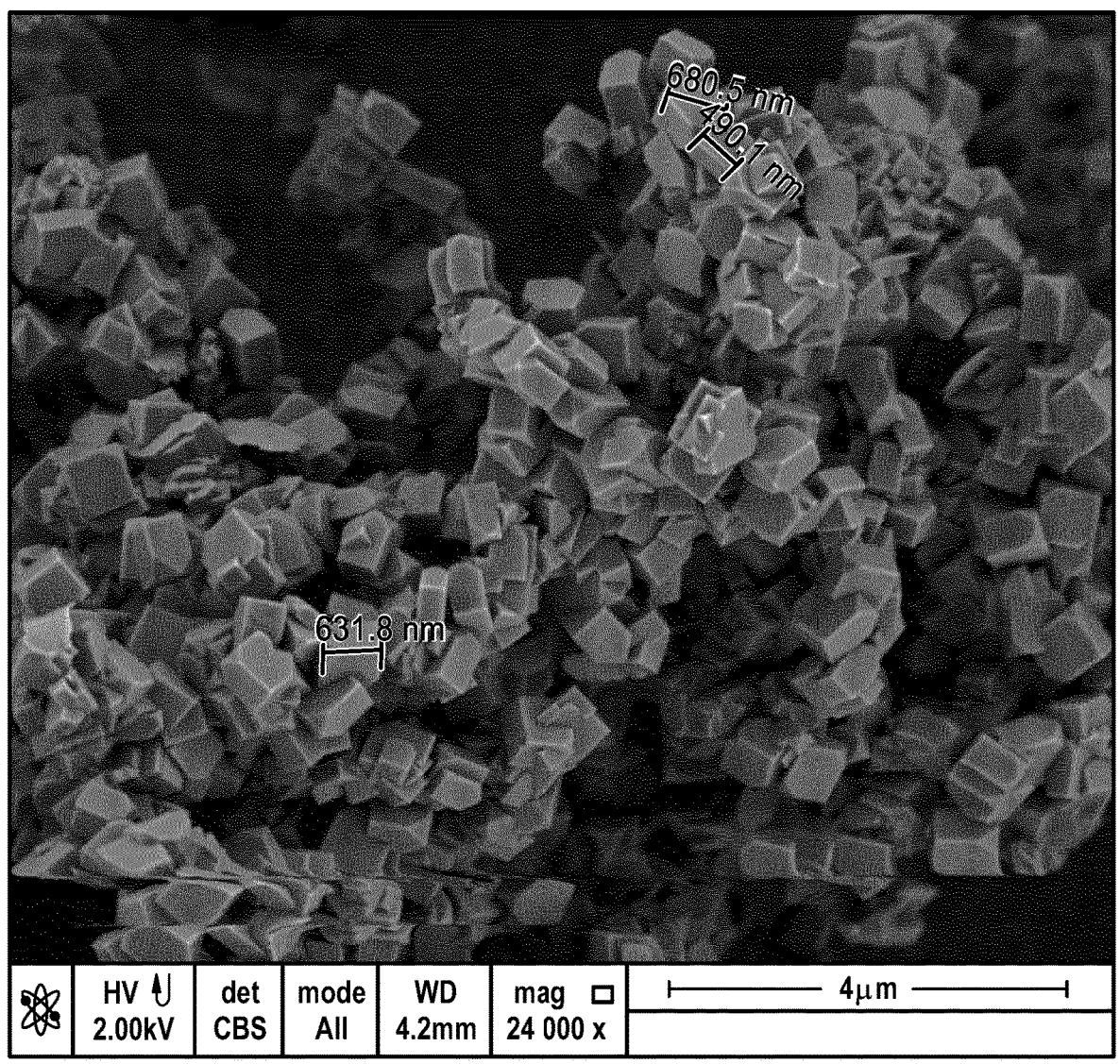
FIG. 4:
SEM image of embodiment 4: AEI zeolite (GV198)
Maximum hydrothermal stability: 900° C.
HV: 2.00 kV
WD: 4.2 mm
Mag: 24 000×

The SEM image of embodiment 4 is shown in FIG. 4.

Embodiment 5: Synthesis of AEI Zeolite (GV228)

A synthesis gel with composition 79.3 $SiO_2$:1 $Al_2O_3$:13.8 SDA:44.0 NaOH:2450 $H_2O$ was prepared by mixing 20.33 g of N,N-dimethylpiperidinium hydroxide (20.46 wt % in $H_2O$) with 0.12 g NaOH pellets, 47.24 g deionized $H_2O$, 31.24 g sodiumsilicate (Merck, 7.5-8.5 wt % $Na_2O$, 25.5-28.5 wt % $SiO_2$) and 1.07 g CBV-500 (Zeolyst). The gel was stirred at room temperature for 20 minutes, and then heated at 135° C. for 7 days under static conditions. The solid product was recovered by filtration and washing with deionized water, and was dried at 60° C. for 16 h. The zeolite produced has an AEI framework type with a SAR of 11.6.

Figure 5:
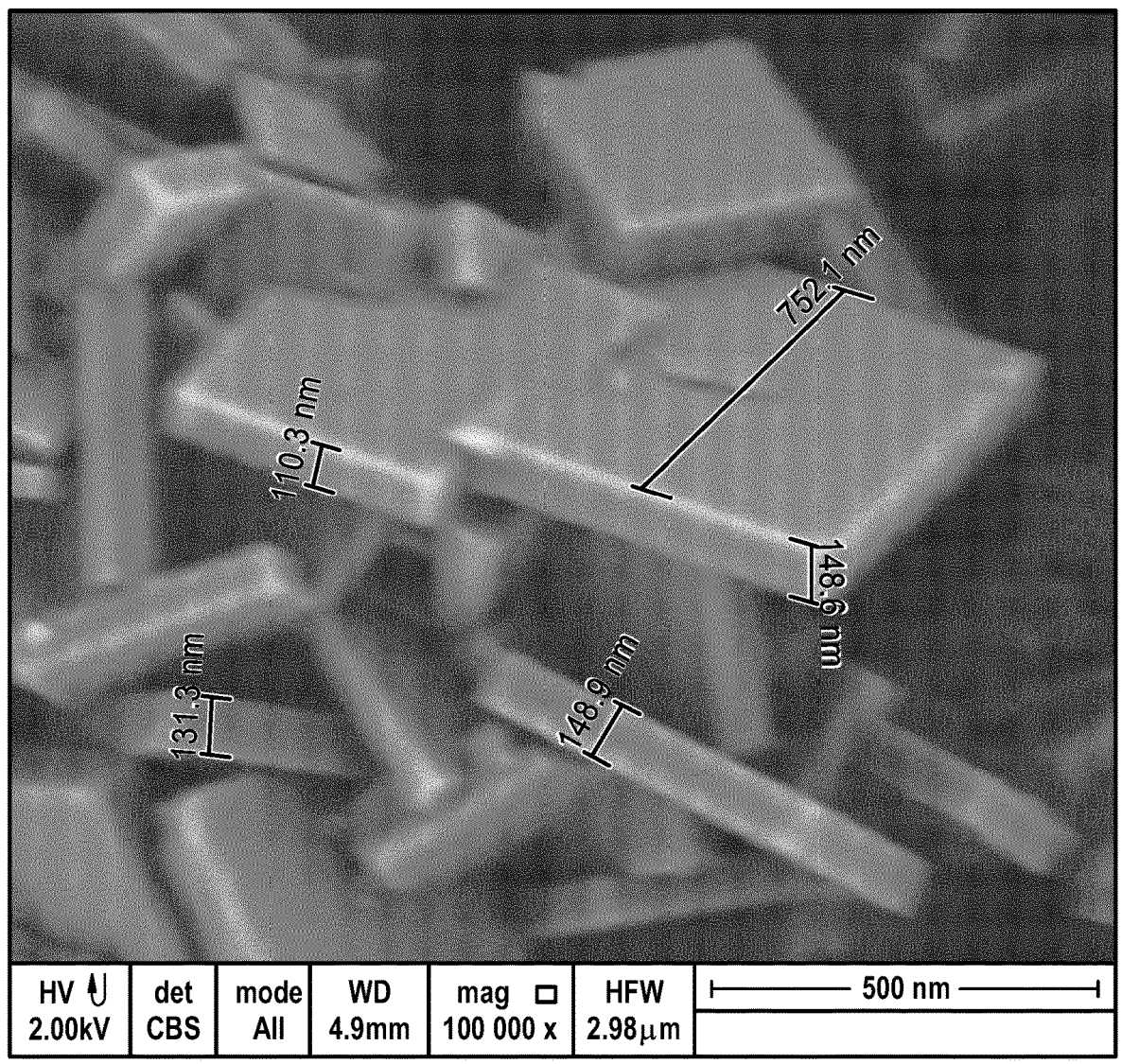
FIG. 5:
SEM image of embodiment 5: AEI zeolite (GV228)
Maximum hydrothermal stability: 900° C.
HV: 2.00 kV
WD: 4.9 mm
Mag: 100 000×
HFW: 2.98 μm

The SEM image of embodiment 5 is shown in FIG. 5.

Embodiment 6: Synthesis of CHA Zeolite (ZS5-GH0088)

The Cu-tetraethylenepentamine complex (Cu-TEPA) was synthesized by adding 37.9 g tetraethylenepentamine (0.2 mole, Sigma-Aldrich) to a solution consisting of 50 g $CuSO_4.5H_2O$ (0.2 mole, Sigma-Aldrich) in 200 g of $H_2O$ (1 M solution) upon stirring. This solution continued stirring for 2 h at room temperature as described in WO 20170/80722 A1).

62 g of zeolite Y with SAR=30 (Si/Al=15) (CBV-720, Zeolyst International) was suspended in 335 mL of a 2.0 M solution of sodium hydroxide. To this solution 31 mL of a 1 M Cu-TEPA solution was added. This suspension was stirred for 15 min and then kept static at 95° C. for 48 h in a closed PP bottle and is referred to as aluminosilicate solution 1.

Aluminosilicate solution 2 was prepared as follows. 5.79 g aluminum-tri-sec-butoxide (Fluka) was added upon stirring to 256.87 g tetraethylammonium hydroxide (35 wt. %, Sigma-Aldrich) in a PP bottle. This mixture was stirred mechanically for 10 minutes. To this solution, 112.81 g Ludox AS-40 (Sigma-Aldrich) was added drop wise upon stirring. 5.19 g of potassium chloride (LabChem) was added slowly. This solution remained stirring for 24 h in the closed PP bottle at room temperature and forms a liquid gel. This gel was aged for another 48 h at room temperature without stirring. After the aging step, aluminosilicate solution 2 was added at once to aluminosilicate solution 1. The final gel has the following molar ratios: 1 $SiO_2$/0.025 $Al_2O_3$/0.39 NaOH/0.041 KCl/0.02 CuTEPA/0.36 tetraethylammonium hydroxide (TEAOH)/20.75 $H_2O$. The resulting mixture was homogenized by vigorous stirring for 15 minutes and afterwards transferred to a stainless steel autoclave. This mixture was heated for 4 days at 150° C. under dynamic conditions. The solid product was recovered by filtration and washing, and was dried at 60° C. for 16 h. The zeolite was calcined at 550° C. for 8 hours with a temperature ramp of 1° C./min.

Figure 6:
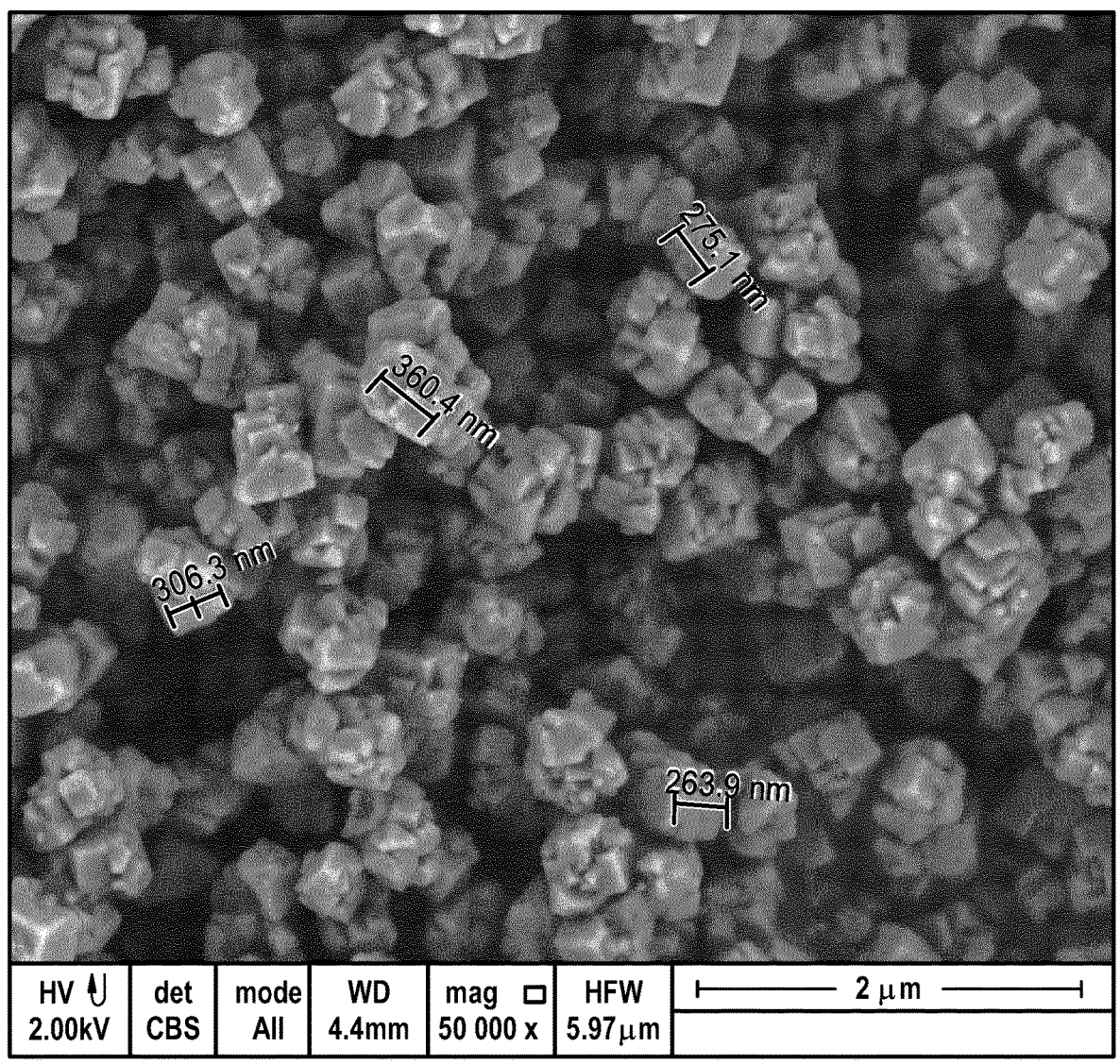
FIG. 6:
SEM image of embodiment 6: CHA zeolite (ZS5-GH008)
Maximum hydrothermal stability: 800° C.
HV: 2.00 kV
WD: 4.4 mm
Mag: 50 000×
HFW: 5.97 μm

The SEM image of embodiment 6 is shown in FIG. 6.

Embodiment 7: Synthesis of CHA Zeolite (ZS5-GH0087)

The Cu-tetraethylenepentamine complex (Cu-TEPA) was synthesized by adding 37.9 g tetraethylenepentamine (0.2 mole, Sigma-Aldrich) to a solution consisting of 50 g $CuSO_4 \cdot 5H_2O$ (0.2 mole, Sigma-Aldrich) in 200 g of $H_2O$ (1 M solution) upon stirring. This solution continued stirring for 2 h at room temperature as described in WO 2017/080722 A1). 61.99 g of zeolite Y with SAR=30 (Si/Al=15) (CBV-720, Zeolyst International) was suspended in 335 mL of a 2.0 M solution of sodium hydroxide. To this solution 31 mL of a 1 M Cu-TEPA solution was added. This suspension was stirred for 15 min and then kept static at 95° C. for 48 h in a closed PP bottle and is referred to as aluminosilicate solution 1.

Figure 7:
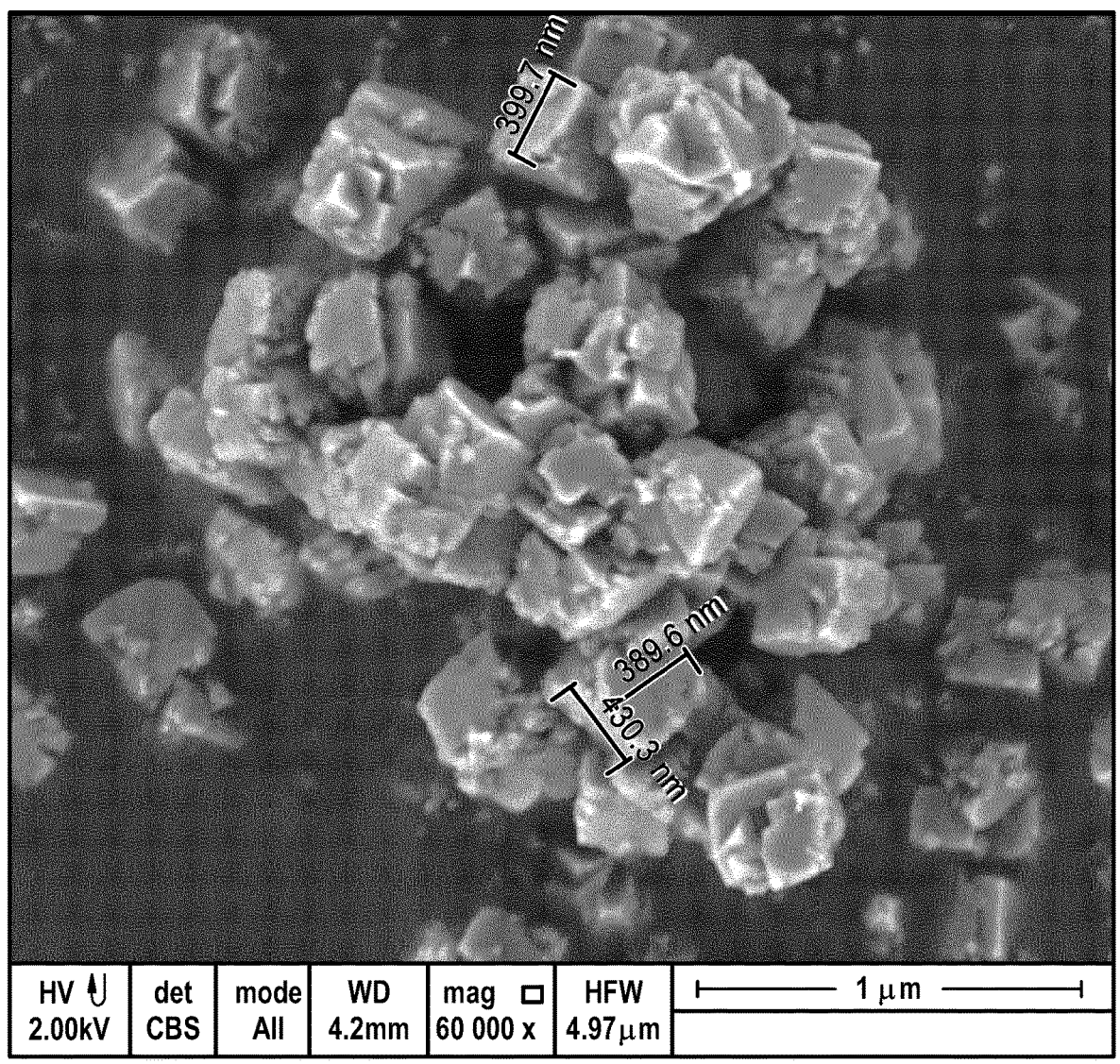
FIG. 7:
SEM image of embodiment 7: CHA zeolite (ZS5-GH0087) Maximum hydrothermal stability: 850° C.
HV: 2.00 kV
WD: 4.2 mm
Mag: 60 000×
HFW: 4.97 μm
FIG. 8
SEM image of embodiment 8: CHA zeolite (GV251)
Maximum hydrothermal stability: 900° C.
HV: 2.00 kV
WD: 4.6 mm
Mag: 40 000×

Aluminosilicate solution 2 was prepared as follows. 5.80 g aluminum-tri-sec-butoxide (Fluka) was added upon stirring to 256.92 g tetraethylammonium hydroxide (35 wt. %, Sigma-Aldrich) in a PP bottle. This mixture was stirred mechanically for 10 minutes. To this solution, 112.84 g Ludox AS-40 (Sigma-Aldrich) was added drop wise upon stirring. This solution remained stirring for 24 h in the closed PP bottle at room temperature and forms a liquid gel. This gel was aged for another 48 h at room temperature without stirring. After the aging step, aluminosilicate solution 2 was added at once to aluminosilicate solution 1. The final gel has the following molar ratios: 1 $SiO_2$/0.025 $Al_2O_3$/0.39 NaOH/0.02 Cu-TEPA/0.36 TEAOH/20.75 $H_2O$. The resulting mixture was homogenized by vigorous stirring for 15 minutes and afterwards transferred to a stainless steel autoclave. This mixture was heated for 4 days at 150° C. under dynamic conditions. The solid product was recovered by filtration and washing, and was dried at 60° C. for 16 h. The zeolite was calcined at 550° C. for 8 hours with a temperature ramp of 1° C./min. The SEM image of embodiment 7 is shown in FIG. 7.

Embodiment 8: Synthesis of CHA Zeolite (GV251)

The Cu-tetraethylenepentamine complex (Cu-TEPA) was synthesized by adding 37.9 g tetraethylenepentamine (0.2 mole, Sigma-Aldrich) to a solution consisting of 50 g $CuSO_4 \cdot 5H_2O$ (0.2 mole, Sigma-Aldrich) in 200 g of $H_2O$ (1 M solution) upon stirring. This solution continued stirring for 2 h at room temperature as described in WO 2017/080722 A1).

22.74 g tetraethylammonium hydroxide (35 wt. %, Sigma-Aldrich) was added to a glass beaker. To this solution, 8.51 g Ludox AS-40 (Sigma-Aldrich) was added drop wise upon stirring. Afterwards 3.03 g hexamethonium bromide (Acros), 29.4 g of a 0.21 M potassium chloride solution (LabChem), 30 g of a 1.13 M sodium hydroxide solution (Fisher Scientific), 1.79 g CBV-500 (Zeolyst) and 2.75 g of a 1 M Cu-TEPA solution was added slowly upon stirring. The final gel has the following molar ratios: $SiO_2$/0.043 $Al_2O_3$/0.46 NaOH/0.08 KCl/0.04 Cu-TEPA/0.73 TEAOH/0.11 RBr/62 $H_2O$ where R is the hexamethonium organic template. The resulting mixture was homogenized by vigorous stirring for 10 minutes and afterwards heated for 168 h at 160° C. under dynamic conditions. The solid product was recovered by centrifugation and washing with deionized $H_2O$, and was dried at 60° C. for 16 h. The zeolite produced has an CHA framework type with a SAR of 17.2.

Figure 8:
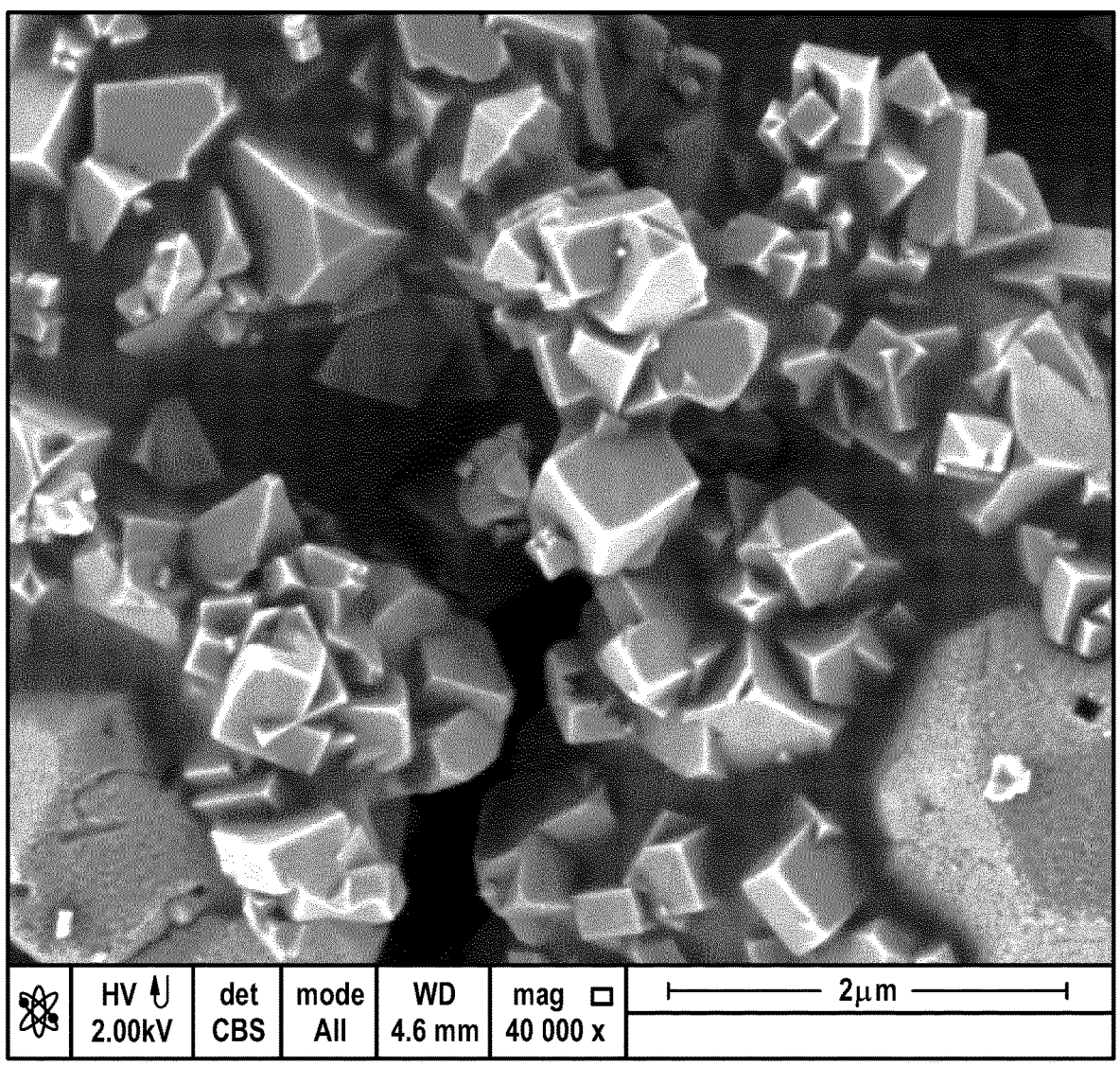

The SEM image of embodiment 8 is shown in FIG. 8.

Embodiment 9: Synthesis of LEV Zeolite (MD101)

A synthesis gel with composition 30.9 $SiO_2$: 1 $Al_2O_3$: 17.5 SDA:7.0 NaOH:186 $H_2O$ was prepared by mixing 2.13 g deionized $H_2O$ with 1.31 g NaCl (Fisher Scientific), 14.71 g choline hydroxide (46 wt % in $H_2O$) and 6.9 g CBV-720 (Zeolyst) upon stirring. The gel was stirred at room temperature for 20 minutes, and then heated at 125° C. for 7 days under static conditions. The solid product was recovered by filtration and washing with deionized water, and was dried at 60° C. for 16 h. The zeolite produced has an LEV framework type with a SAR of 16.8.

Figure 9:
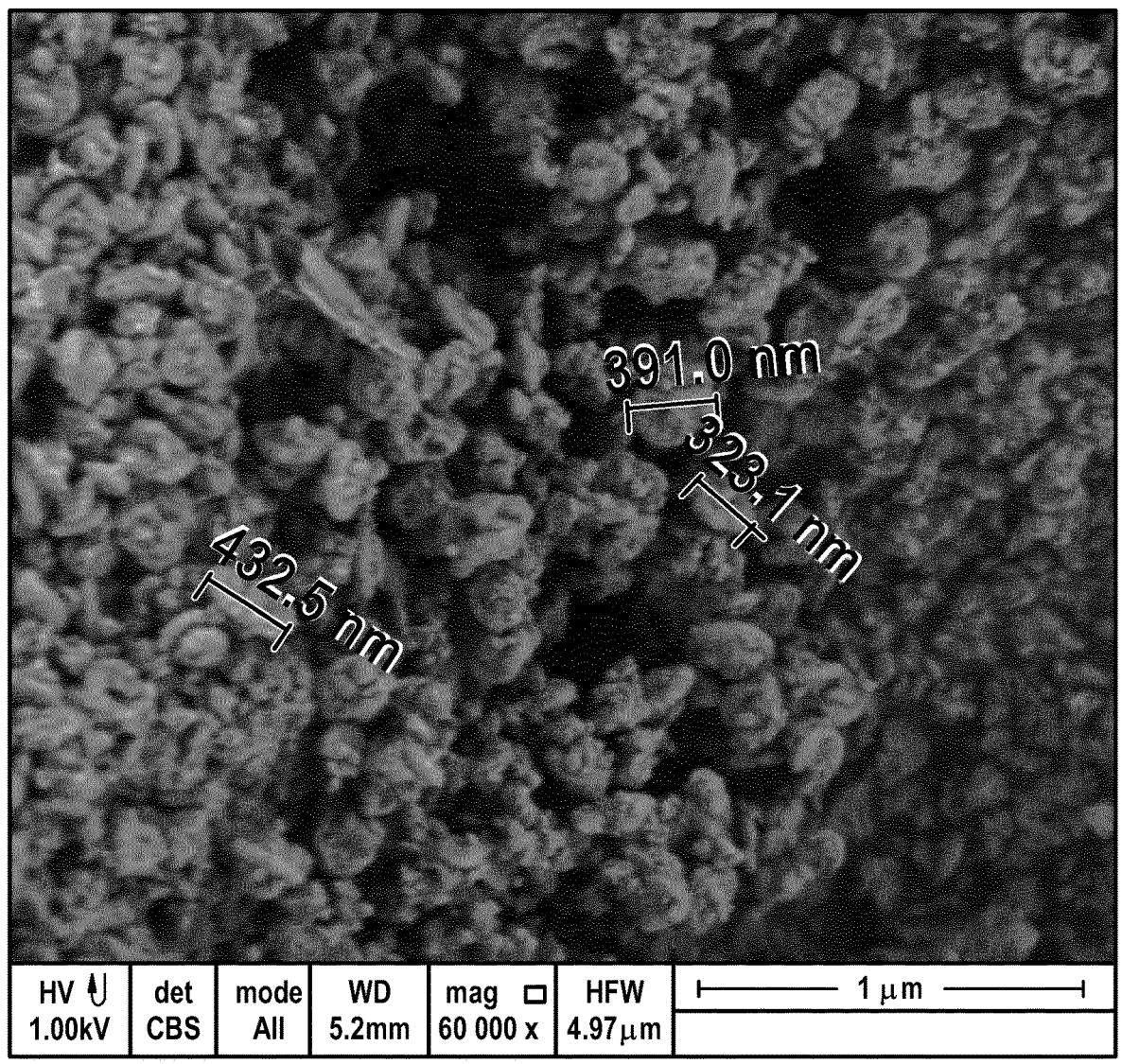
FIG. 9:
SEM image of embodiment 9: LEV zeolite (MD101)
Maximum hydrothermal stability: 700° C.
HV: 1.00 kV
WD: 5.2 mm
Mag: 60 000×
HFW: 4.97 μm

The SEM image of embodiment 9 is shown in FIG. 9.

Embodiment 10: Synthesis of LEV Zeolite (GV118)

A synthesis gel with composition 20.3 $SiO_2$: 1 $Al_2O_3$: 10.1 SDA:1 NaOH:101 $H_2O$ was prepared by mixing 14.9 g diethyldimethylammonium hydroxide (Aldrich, 40 wt % in $H_2O$) with 0.2 g NaOH pellets, 0.77 g aluminum hydroxide (BDH) and 6 g silica (Cab-O-Sil M5) upon stirring. The gel was stirred at room temperature for 20 minutes, and then heated at 150° C. for 3 days under dynamic conditions. The solid product was recovered by filtration and washing with deionized water, and was dried at 60° C. for 16 h. The zeolite produced has an LEV framework type with a SAR of 18.7.

Figure 10:
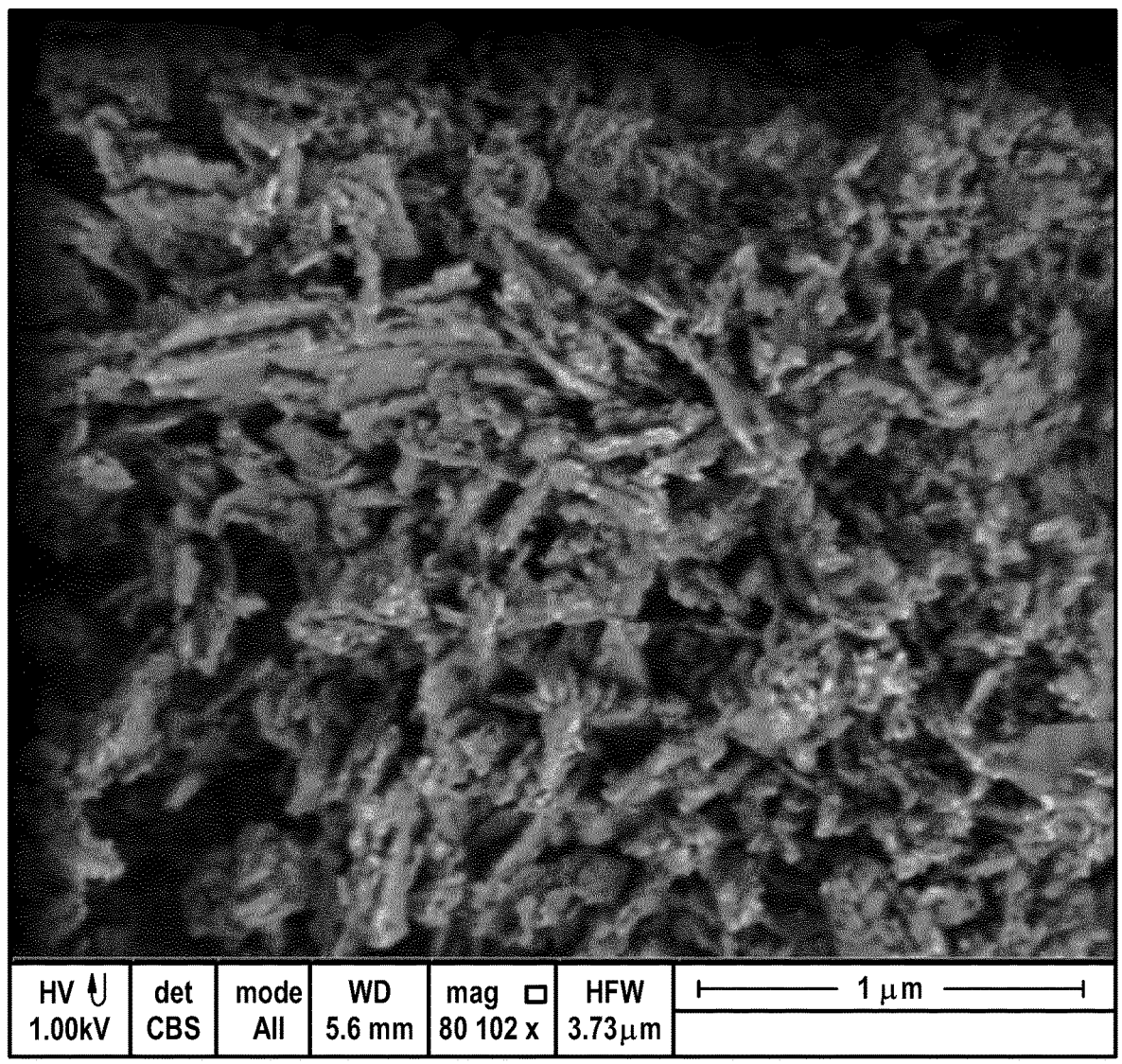
FIG. 10:
SEM image of embodiment 10: LEV zeolite (GV118)
Maximum hydrothermal stability: 750° C.
HV: 1.00 kV
WD: 5.6 mm
Mag: 80 102×
HFW: 3.73 μm

The SEM image of embodiment 10 is shown in FIG. 10.

Embodiment 11: Synthesis of LEV Zeolite (GV175)

A synthesis gel with composition 27.5 $SiO_2$:1 $Al_2O_3$:8.8 SDA:3.4 NaOH:1090 $H_2O$ was prepared by mixing 25.32 g Ludox SM-30 (Aldrich) with 6.31 g 1-adamantylamine (97 wt %, Aldrich), 68.48 g deionized $H_2O$, 0.87 g sodiumaluminate (Riedel-de Haen, 41% $Na_2O$, 54% $Al_2O_3$) and 0.16 g NaOH in 3.94 g deionized $H_2O$ upon stirring. The gel was stirred at room temperature for 30 minutes, and then heated at 180° C. for 6 days under dynamic conditions. The solid product was recovered by filtration and washing with deionized water, and was dried at 60° C. for 16 h. The zeolite produced has an LEV framework type with a SAR of 23.6.

Figure 11:
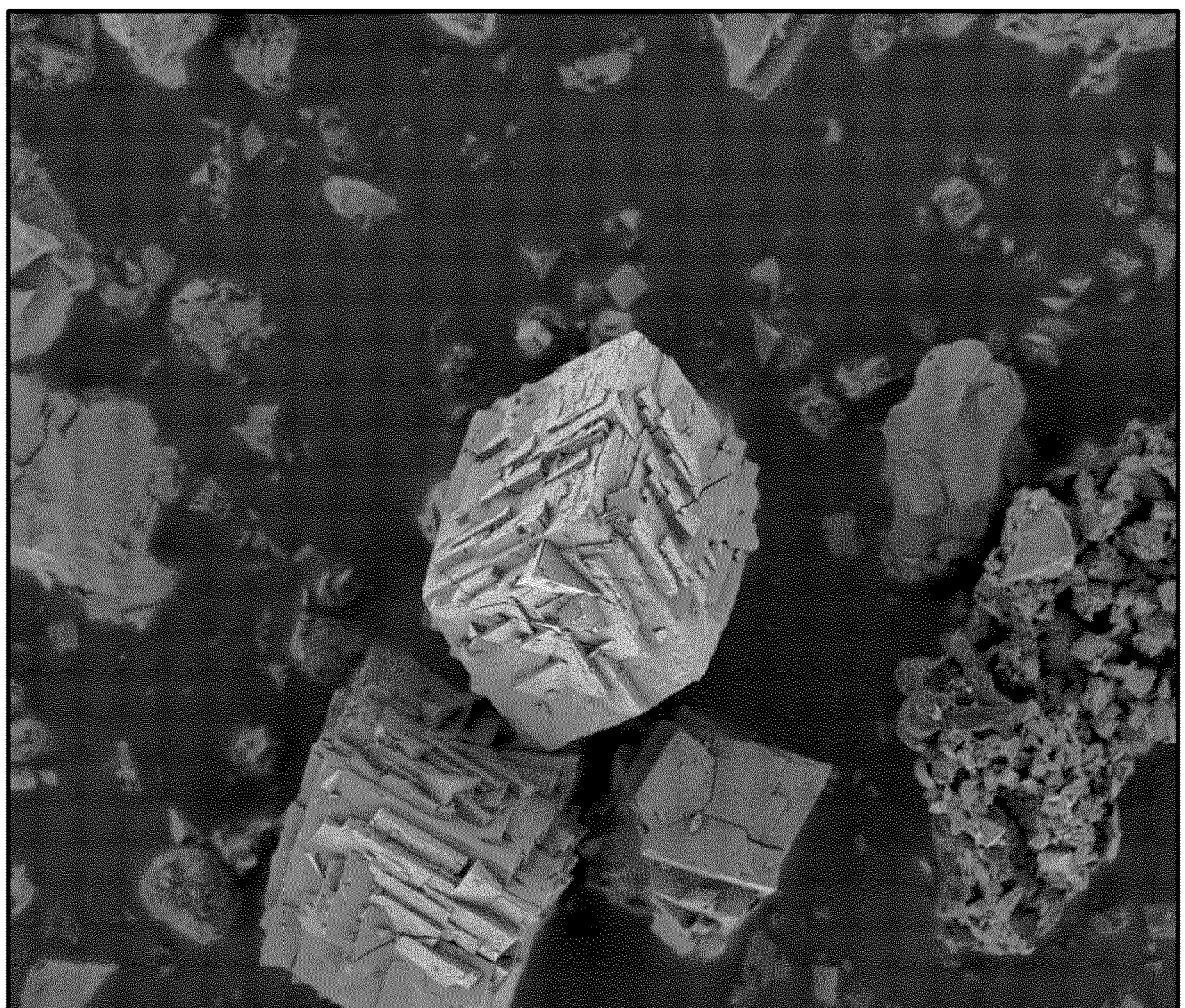
FIG. 11:
SEM image of embodiment 11: LEV zeolite (GV175)
Maximum hydrothermal stability: 900° C.
HV: 1.00 kV
WD: 4.6 mm
Mag: 5 000×
HFW: 59.7 μm

The SEM image of embodiment 11 is shown in FIG. 11.

Embodiment 12: Synthesis of ERI/CHA Zeolite (ZS5-GH0023)

The Cu-tetraethylenepentamine complex (Cu-TEPA) was synthesized by adding 37.9 g tetraethylenepentamine (0.2 mole, Sigma-Aldrich) to a solution consisting of 50 g $CuSO_4.5H_2O$ (0.2 mole, Sigma-Aldrich) in 200 g of $H_2O$ (1 M solution) upon stirring. This solution continued stirring for 2 h at room temperature as described in WO 2017/080722 A1).

310 g of zeolite Y with SAR=30 (Si/Al=15) (CBV-720, Zeolyst International) was suspended in 1674 mL of a 2.0 M solution of sodium hydroxide. To this solution 155 mL of a 1 M Cu-TEPA solution was added. This suspension was stirred for 15 min and then kept static at 95° C. for 48 h in a closed PP bottle and is referred to as aluminosilicate solution 1. Aluminosilicate solution 2 was prepared as follows. 29.09 g aluminum-tri-sec-butoxide (Fluka) was added upon stirring to 1284.4 g tetraethylammonium hydroxide (35 wt. %, Sigma-Aldrich) in PP bottle. This mixture was stirred mechanically for 10 minutes. To this solution, 564.20 g Ludox AS-40 (Sigma-Aldrich) was added drop wise upon stirring and afterwards 170.60 g hexamethonium bromide (Acros) was added at once. Another 25.83 g of potassium chloride (LabChem) This solution remained stirring for 24 h in the closed PP bottle at room temperature and forms a liquid gel. This gel was aged for another 48 h at room temperature without stirring.

After the aging step, aluminosilicate solution 2 was added at once to aluminosilicate solution 1. The final gel has the following molar ratios: 1 $SiO_2$/0.025 $Al_2O_3$/0.39 NaOH/0.041 KCl/0.02 Cu-TEPA/0.36 TEAOH/0.18 RBr/20.75 $H_2O$ where R is the hexamethonium organic template. The resulting mixture was homogenized by vigorous stirring for 15 minutes and afterwards transferred to a stainless steel autoclave. This mixture was heated for 4 days at 150° C. under dynamic conditions. The solid product was recovered by filtration and washing, and was dried at 60° C. for 16 h. The zeolite was calcined at 750° C. for 8 hours with a temperature ramp of 1° C./min.

Figure 12:
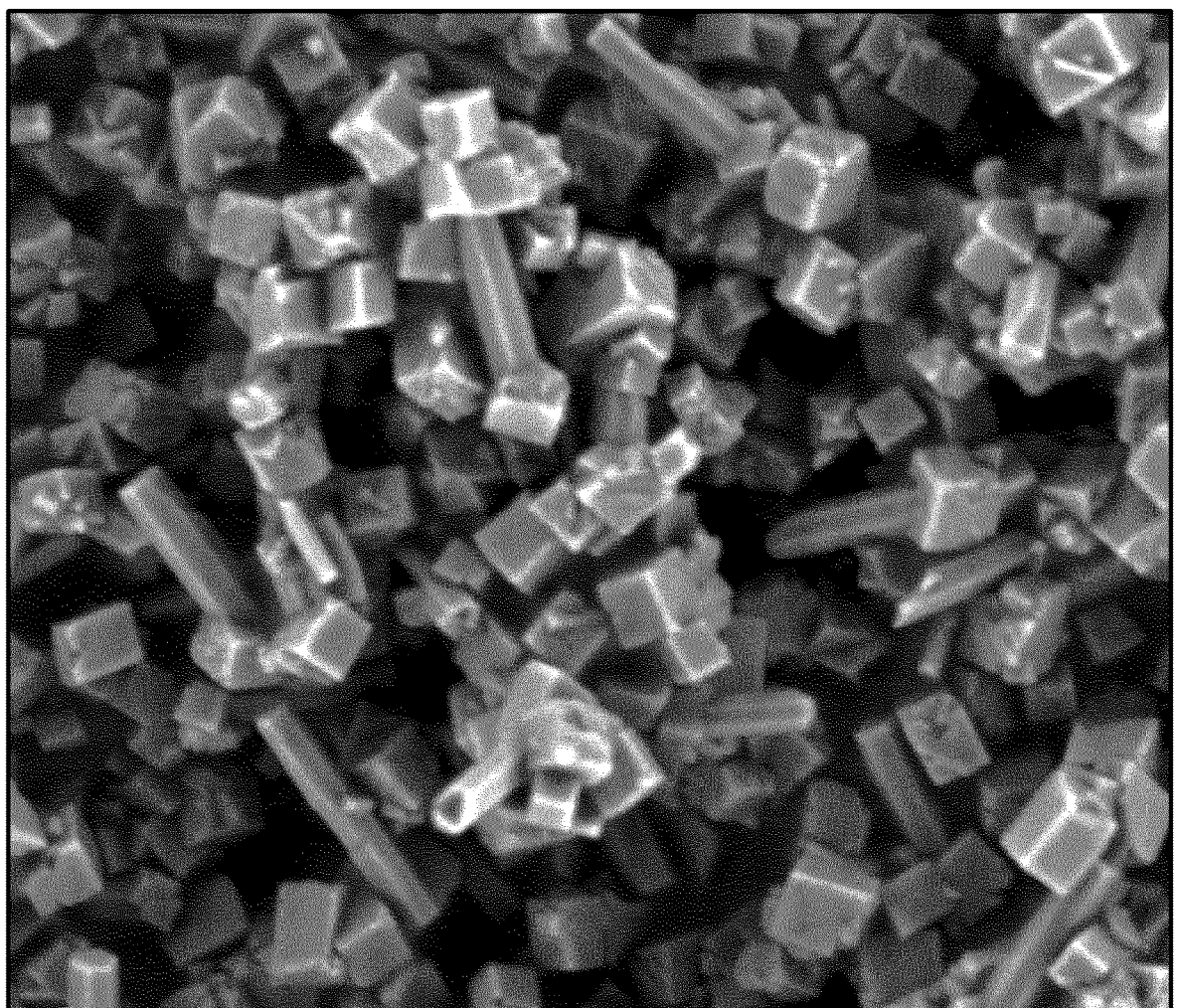
FIG. 12:
SEM image of embodiment 12: ERI/CHA zeolite (ZS5-GH0023) Maximum hydrothermal stability: 800° C.
HV: 2.00 kV
WD: 4.2 mm
Mag: 50 000×
HFW: 5.97 μm

The SEM image of embodiment 12 is shown in FIG. 12.

Embodiment 13: Synthesis of ETL Zeolite (SK120)

A synthesis gel with composition 30 $SiO_2$:1 $Al_2O_3$: 5.1 SDA:11.7 RbOH:1394 $H_2O$ was prepared by mixing 0.52 g aluminum hydroxide (BDH) with 8 mL of RbOH solution (50 wt % in $H_2O$), 6 g silica (Cab-O-Sil M5), 75 g deionized $H_2O$ and 6.2 g tetramethylammonium hydroxide (TMAOH) (25 wt % in $H_2O$) upon stirring. The gel was stirred at room temperature for 30 minutes, and then heated at 180° C. for 5 days under dynamic conditions. The solid product was recovered by filtration and washing with deionized water, and was dried at 60° C. for 16 h. The zeolite produced has an ETL framework type with a SAR of 15.6.

Figure 13:
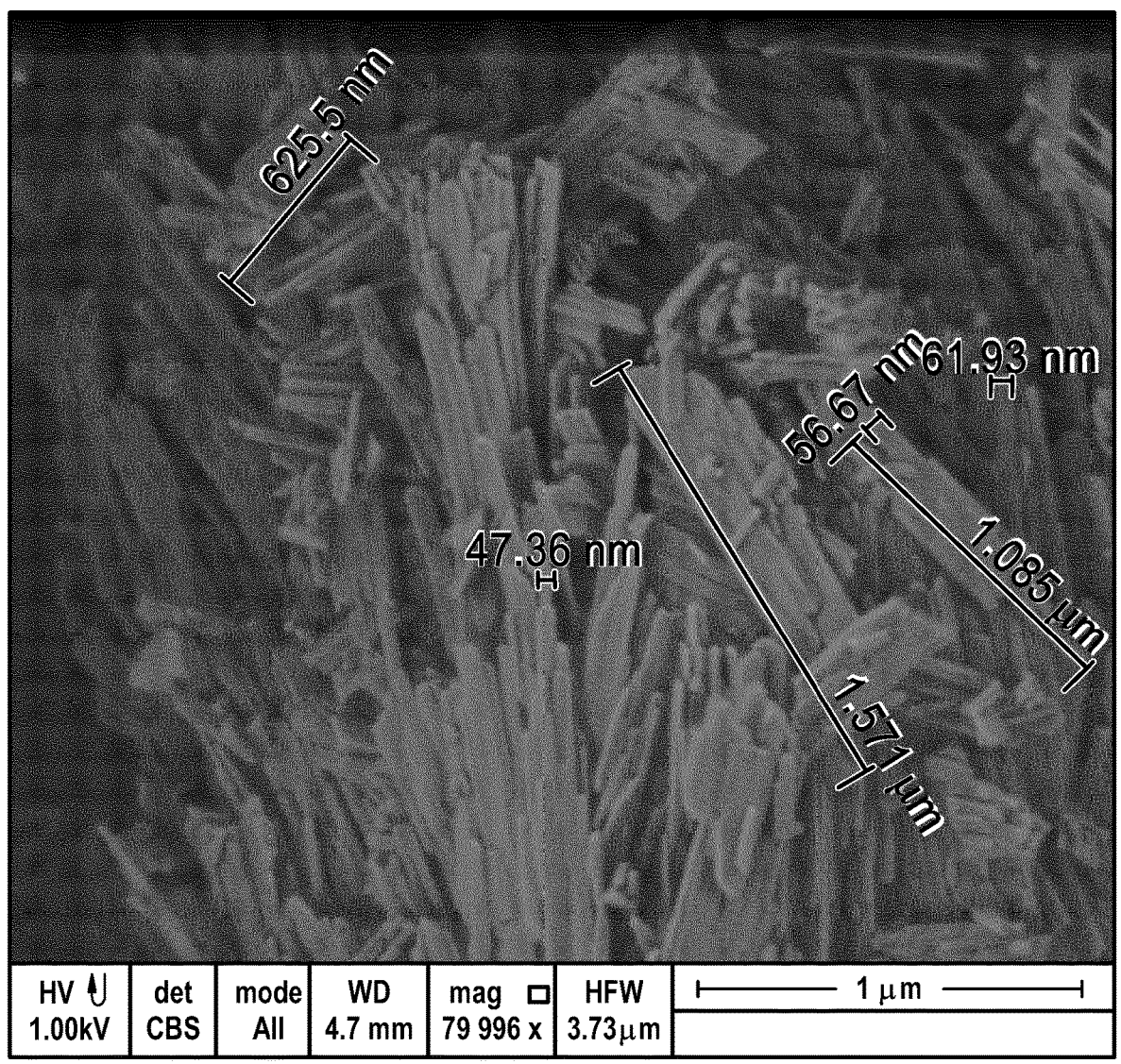
FIG. 13.

The SEM image of embodiment 13 is shown in FIG. 13.

Embodiment 14: Synthesis of ESV Zeolite (SKES009)

A synthesis gel with composition 25 $SiO_2$:1 $Al_2O_3$: 6.2 SDA:20.6 NaOH:999 $H_2O$ was prepared by mixing 5.81 g SDA (N,N-dimethylpiperidiniumbromide) with 1.20 g NaOH pellets, 26.62 g sodiumsilicate (Merck, 7.5-8.5 wt % $Na_2O$, 25.5-28.5 wt % $SiO_2$), 3.19 g aluminumsulfate (Vel, $Al_2(SO_4)_3.18H_2O$) and 68.89 g deionized $H_2O$ upon stirring. The gel was stirred at room temperature for 20 minutes, and then heated at 170° C. for 6 days under static conditions. The solid product was recovered by filtration and washing with deionized water, and was dried at 60° C. for 16 h. The zeolite produced has an ESV framework type with a SAR of 17.3.

Embodiment 15: Synthesis of DDR Zeolite (GV176)

A synthesis gel with composition 30.5 $SiO_2$:1 $Al_2O_3$: 12.9 SDA:3.8 NaOH:1528 $H_2O$ was prepared by mixing 20.37 g Ludox SM-30 (Aldrich) with 6.71 g 1-adamantylamine (97 wt %, Aldrich), 73.07 g deionized $H_2O$, 0.63 g sodiumaluminate (Riedel-de Haen, 41% $Na_2O$, 54% $Al_2O_3$) and 0.17 g NaOH in 4.23 g deionized $H_2O$ upon stirring. The gel was stirred at room temperature for 30 minutes, and then heated at 180° C. for 6 days under dynamic conditions. The solid product was recovered by filtration and washing with deionized water, and was dried at 60° C. for 16 h. The zeolite produced has an DDR framework type with a SAR of 29.1.

Embodiment 16: Synthesis of KFI Zeolite (GV009)

A synthesis gel with composition 11 $SiO_2$:1 $Al_2O_3$:5.2 K:0.1 Sr:152 $H_2O$ was prepared by mixing 3.96 g aluminum hydroxide (BDH), 7.46 g of KOH (VWR), 12.54 g deionized $H_2O$, 41.98 g Ludox HS-40 (Aldrich) and 0.52 g $Sr(NO_3)_2$ (Acros) dissolved in 31.92 g deionized $H_2O$ upon stirring. The gel was stirred at room temperature for 20 minutes, and then heated at 150° C. for 7 days under static conditions. The solid product was recovered by filtration and washing with deionized water, and was dried at 60° C. for 16 h.

The zeolite produced has a KFI framework type with a SAR of 8.2.

Figure 14:
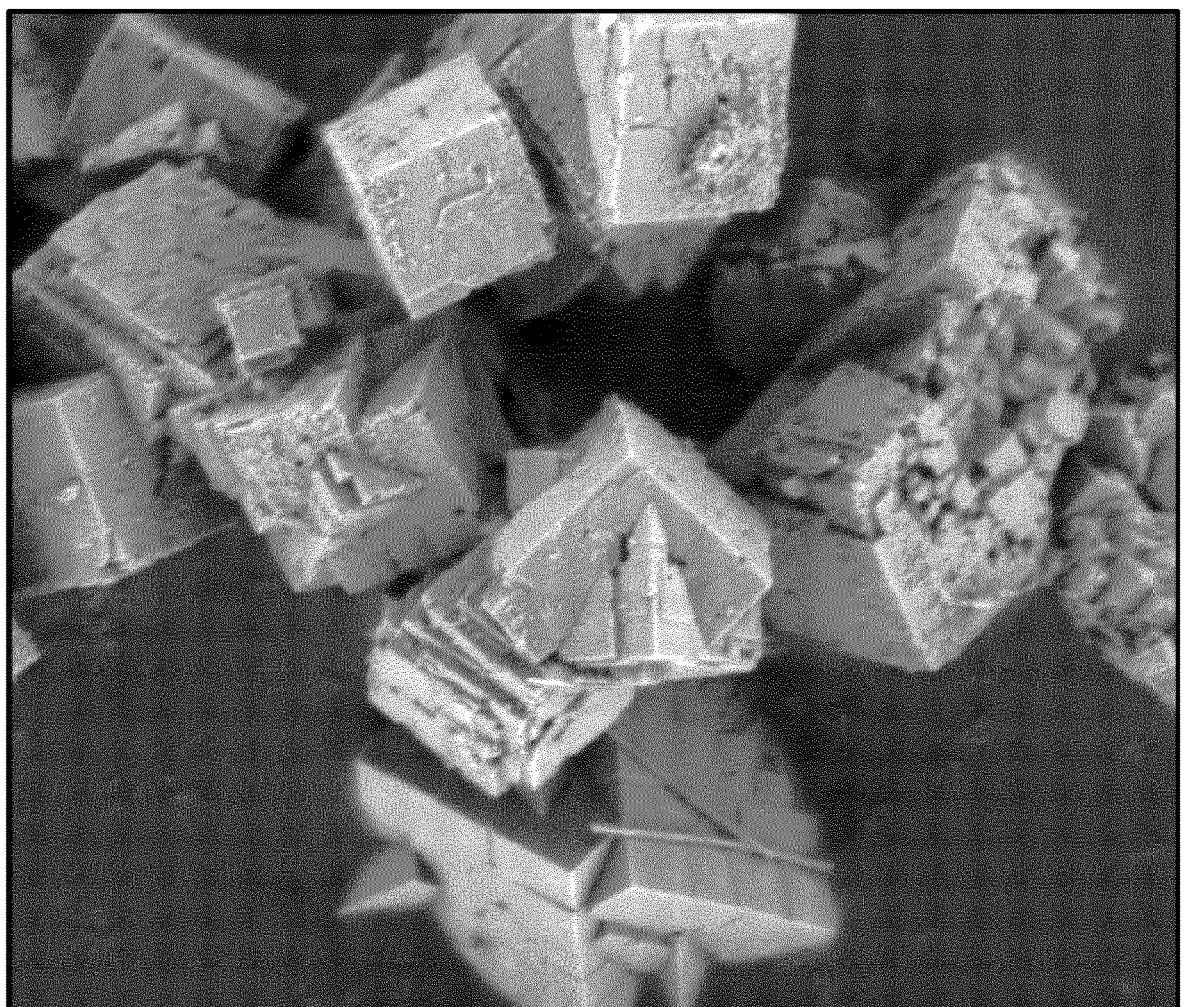

The SEM image of embodiment 16 is shown in FIG. 14.

Embodiment 17: Synthesis of UFI Zeolite (GV051)

A synthesis gel with composition 16.2 $SiO_2$:1 $Al_2O_3$:16.4 triethanolamine (TEA): 2.2 trimethylaluminium (TMA): 361 $H_2O$ was made by first preparing a mixture of 17.43 g TEAOH (35 wt % in $H_2O$, Aldrich), 1.25 g aluminum-sec-butoxide (Fluka), 6.16 g Ludox As-40 (Aldrich) and 0.21 g deionized $H_2O$ which is heated at 95° C. for 18 h under static conditions. Afterwards, 0.6 g TMACl in 1.16 g deionized $H_2O$ is added to the first mixture upon stirring. The gel was stirred at room temperature for 30 minutes, and then heated at 150° C. for 4 days under static conditions. The solid product was recovered by filtration and washing with deionized water, and was dried at 60° C. for 16 h. The zeolite produced has an UFI framework type with a SAR of 17.4.

Figure 15:
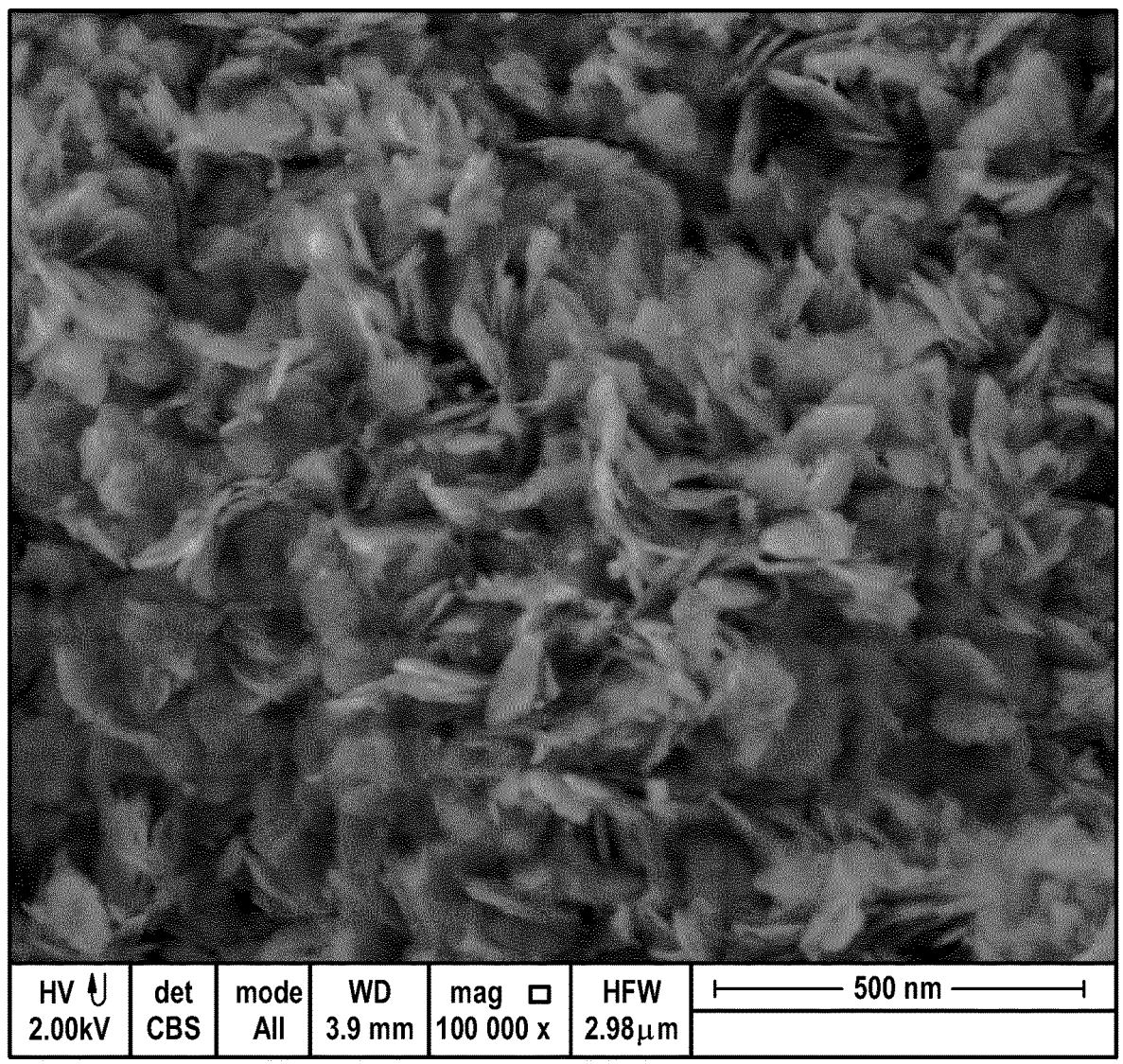

The SEM image of embodiment 17 is shown in FIG. 15.

Embodiment 18: Synthesis of AFX Zeolite (SPSS076)

A synthesis gel with composition 30.8 $SiO_2$:1 $Al_2O_3$: 2.9 SDA:23.4 Na:939 $H_2O$ was prepared by mixing 48.86 g deionized $H_2O$, 1.32 g NaOH pellets, 20.95 g sodiumsilicate (Merck, 7.5-8.5 wt % $Na_2O$, 25.5-28.5 wt % $SiO_2$), 2.09 g CBV-500 (Zeolyst) and 5.05 g 1,4-diazabicyclo[2.2.2]-octane-C4-diquat dibromide upon stirring. The gel was stirred at room temperature for 40 minutes, and then heated at 150° C. for 5 days under dynamic conditions. The solid product was recovered by filtration and washing with deionized water, and was dried at 60° C. for 16 h. The zeolite produced has an AFX framework type with a SAR of 8.9.

Figure 16:
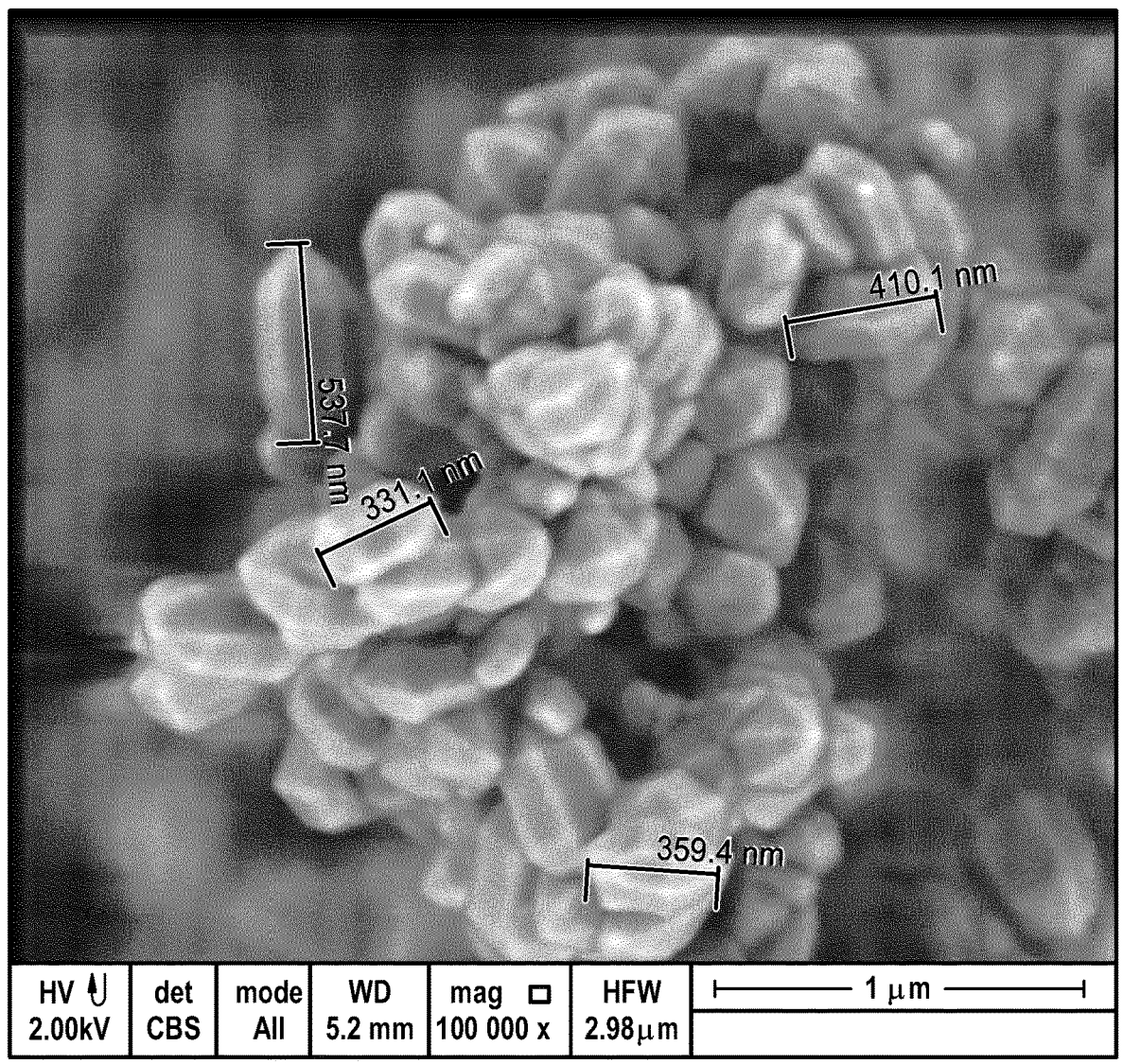

The SEM image of embodiment 18 is shown in FIG. 16.

Embodiment 19: Determination of Proton Content

The as made zeolite was calcined in air at 550° C. for 8 hours with a heating rate of 1° C./min. Afterwards the calcined zeolite was suspended in a 0.5 M NH₄Cl solution (100 ml per g of sample) and kept under reflux conditions for 4 hours. This procedure is repeated twice and followed by a drying step at 60° C. in air for 16 h. Subsequently, the zeolite is calcined in air at 650° C. for 8 hours with a heating rate of 1° C./min. Finally, the samples were packed in a 4 mm zirconia solid state NMR rotor and dried under vacuum (1 mbar) at 90° C. for 30 min and at 200° C. for 16 h. After flushing with $N_2$ gas, the rotor was sealed.

$^1$H MAS NMR experiments were performed at 295 K on a Bruker Ultrashield Plus 500 MHz spectrometer (static magnetic field of 11.7 T) equipped with a 4 mm H/X/Y magic angle spinning (MAS) solid-state probe. Samples were spun at 10 kHz. $^1$H spectra were recorded using a π/2 flip angle with a pulse length of 2.95 μs and a repetition delay of 5 s. Adamantane was used as an external secondary reference for the chemical shift referencing to TMS. The $^1$H spectra were integrated between 20 and −8 ppm (between 2 and −8 ppm) using Bruker Topspin 3.5 software. Absolute quantification of the integrated areas was performed as described in M Houlleberghs, A Hoffmann, D Dom, C E A Kirschhock, F Taulelle, J A Martens and E Breynaert: "Absolute Quantification of Water in Microporous Solids with $^1$H Magic Angle Spinning NMR and Standard Addition", Anal Chem 2017, 89, 6940-6943".

Embodiment 20: Determination of Hydrothermal Stability

The as made zeolite was calcined in air at 550° C. for 8 hours with a heating rate of 1° C./min. A 0.5 M NH₄Cl solution is made by dissolving 13.4 g NH₄Cl (MP Biomedicals LLC) in 500 mL deionized H₂O. The calcined zeolite is suspended in the 0.5 M NH₄Cl solution (1 g zeolite in 100 mL) and heated under reflux conditions for 4 hours upon stirring, followed by centrifugation. The combination of ion-exchange and centrifugation was performed three times. The solid product was recovered by centrifugation after washing with deionized water and was dried at 60° C. for 24 hours. A solution of 300 mL deionized water and 0.28 g copper acetate (Sigma-Aldrich) was prepared in a PP bottle.

3 grams of the zeolite is added to this solution. The suspension is stirred at room temperature in a closed PP bottle for 20 hours. Afterwards, the zeolite in its copper exchanged form is recovered by centrifugation. This procedure is repeated twice. The final material is then washed with deionized water by centrifugation and dried at 60° C. for 48 hours. The hydrothermal stability was determined by heating Cu loaded zeolite catalyst pellets to 900° C. in a quartz tube under air flow (2 mL/min) with an absolute humidity of 12 vol. % for 3 h with a heating rate of 5° C./min. Cooling was performed under a 40 mL/min dry nitrogen flow. Prior to this experiment, the powder was pelletized to a particle size between 125 and 250 μm to avoid pressure build-up in the quartz tube.

Proton Content—Decomposition

When decomposing the spectrum, the baseline is corrected through a cubic spline interpolation method incorporated in the Topspin 3.5 software. The decomposition is performed using the DmFit Software (Version Amfit/release #20180327') using Lorentzian curves. The signals fitted between 1 and 2 ppm are defined as silanol species, the signals between 2 and 3.5 ppm are defined as aluminol species or other defect-related sites and the signals between 3.5 and 5 ppm are defined as Brønsted acid sites.

Absolute quantification of the Si—OH region was ensured with the combination of $^1$H MAS NMR detection with standard addition of water. The dried spectrum was used to derive the total spectrum surface area and the Si—OH region surface area. The dried sample within the rotor was then hydrated with known amounts of water by adding a known mass of water to the packed rotor and afterwards equilibrating the capped rotor overnight at 333 K to ensure homogeneous distribution of water throughout the sample. A sample-dependent linear correlation function (y=Ax+B) was obtained showing the integrated $^1$H NMR signals of the (de)hydrated zeolite samples (y) plotted against water addition (x). The absolute Si—OH content can be derived using the slope A and the Si—OH surface area, corrected for sample weight and number of scans. Probe tuning and matching was carried out using a vectorial Network Analyzer to ensure comparable Q factors between the (de)hydrated states as to maximize accuracy and reproducibility when acquiring the linear correlation function for each sample (M Houlleberghs, A Hoffmann, D Dom, C E A Kirschhock, F Taulelle, J A Martens and E Breynaert: "Absolute Quantification of Water in Microporous Solids with $^1$H Magic Angle Spinning NMR and Standard Addition", Anal Chem 2017, 89, 6940-6943").

TABLE 2

Hydrothermal stability of the Cu loaded zeolites from Embodiment 1 to 18

| Embodiment number | Framework type code | Proton content (mmol/g) | Cu content (Wt. %) | Maximum hydrothermal stability (° C.) |
|---|---|---|---|---|
| 1 | AEI | 2.4 | 3.8 | 800 |
| 2 | AEI | 2.3 | 3.2 | 850 |
| 3 | AEI | 1.6 | 2.9 | 900 |
| 4 | AEI | 1.5 | 3.1 | 900 |
| 5 | AEI | 1.3 | 2.9 | 900 |
| 6 | CHA | 2.3 | 4.1 | 800 |
| 7 | CHA | 2.0 | 3.9 | 850 |
| 8 | CHA | 1.8 | 2.8 | 900 |
| 9 | LEV | 3.3 | 4.1 | 700 |
| 10 | LEV | 3.1 | 4.1 | 750 |
| 11 | LEV | 1.5 | 0.8 | 900 |
| 12 | ERI/CHA | 3.0 | 4.3 | 800 |
| 13 | ETL | 1.6 | 1.2 | 850 |
| 14 | ESV | 1.0 | 4.1 | 900 |
| 15 | DDR | 1.3 | 1.6 | 900 |
| 16 | KFI | 2.8 | 4.2 | 800 |
| 17 | UFI | 2.8 | 3.8 | 800 |
| 18 | AFX | 2.2 | 5.6 | 800 |

Figure 17:
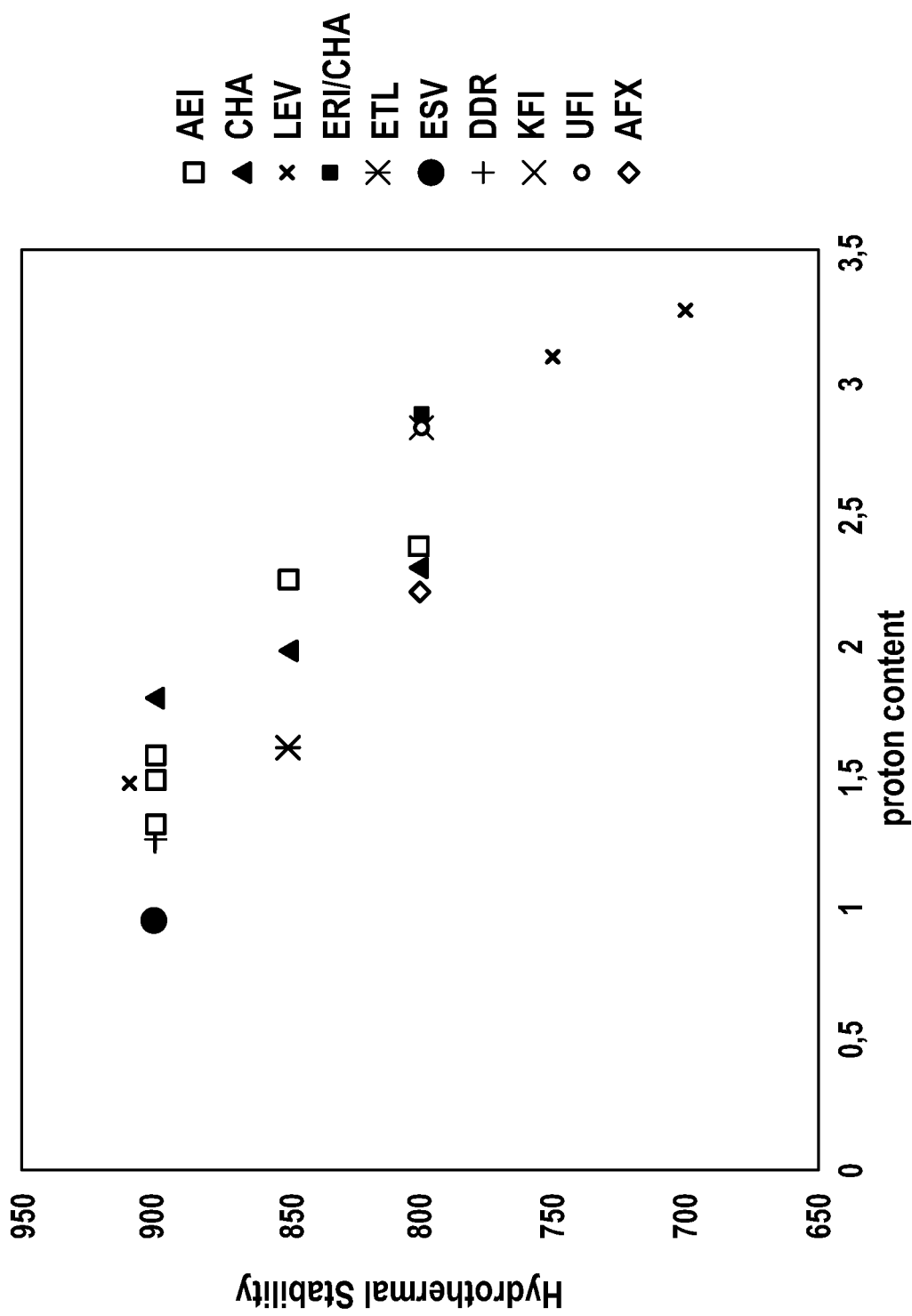
Figure 18:
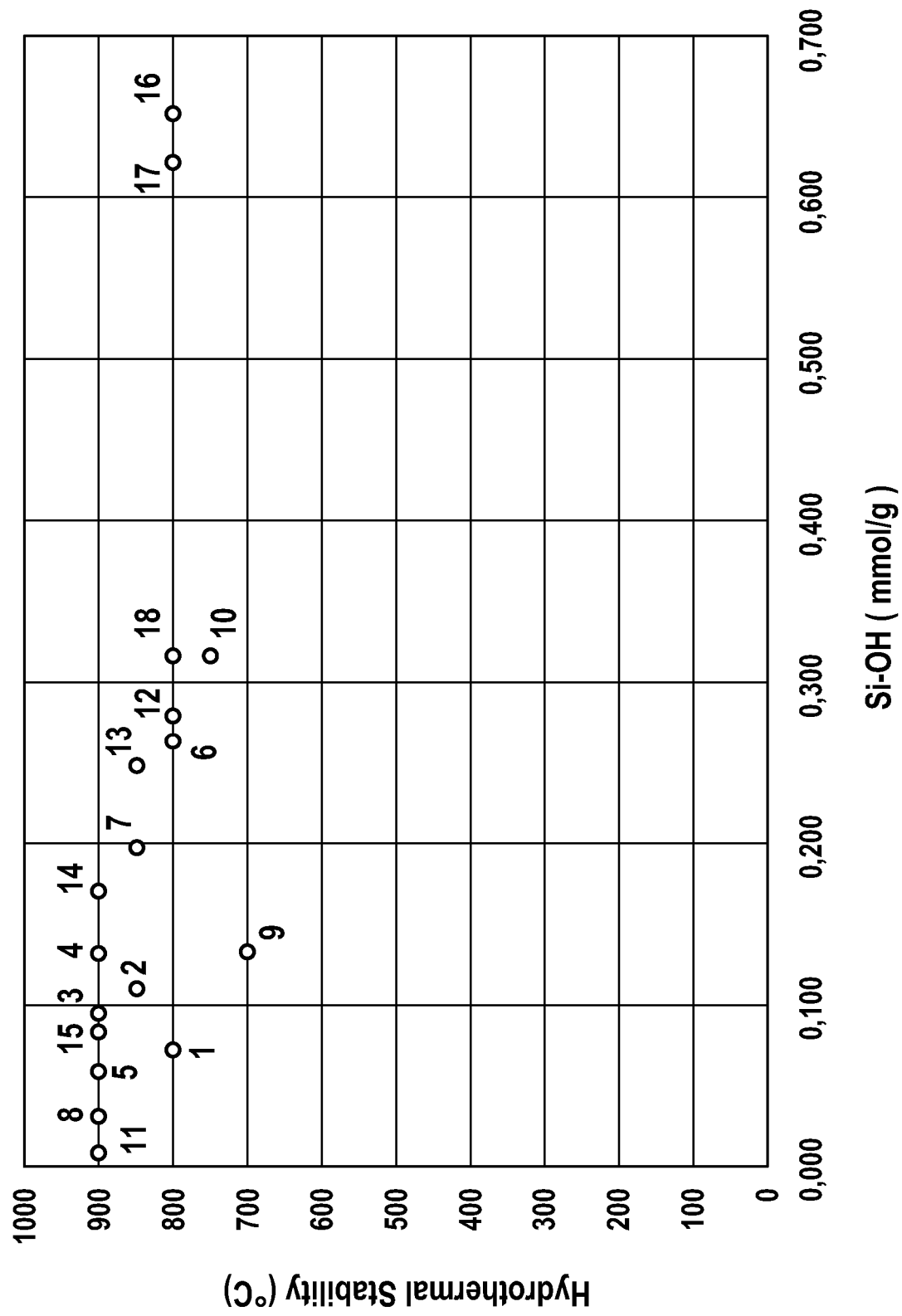
Figure 19:
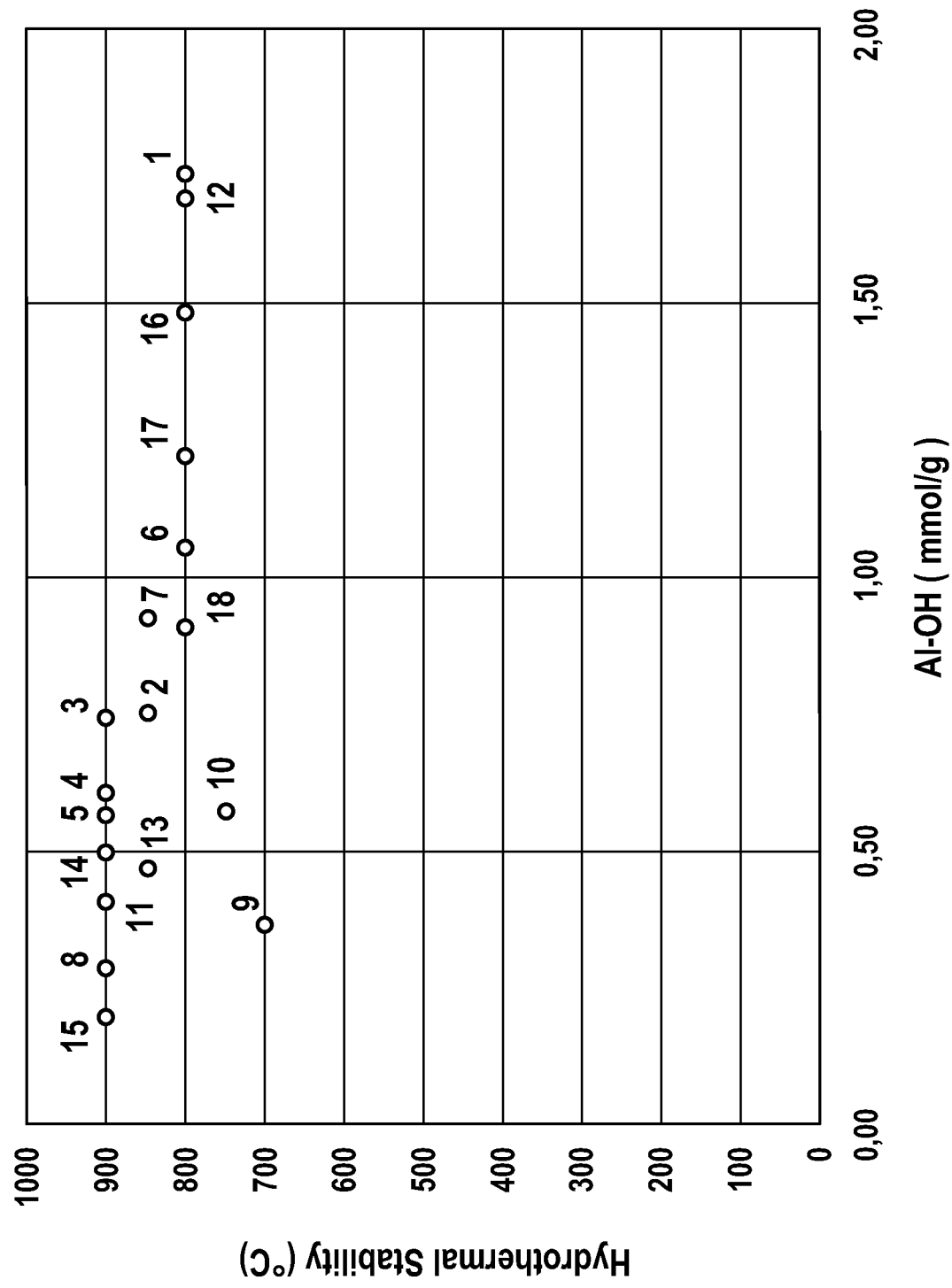
Figure 20:
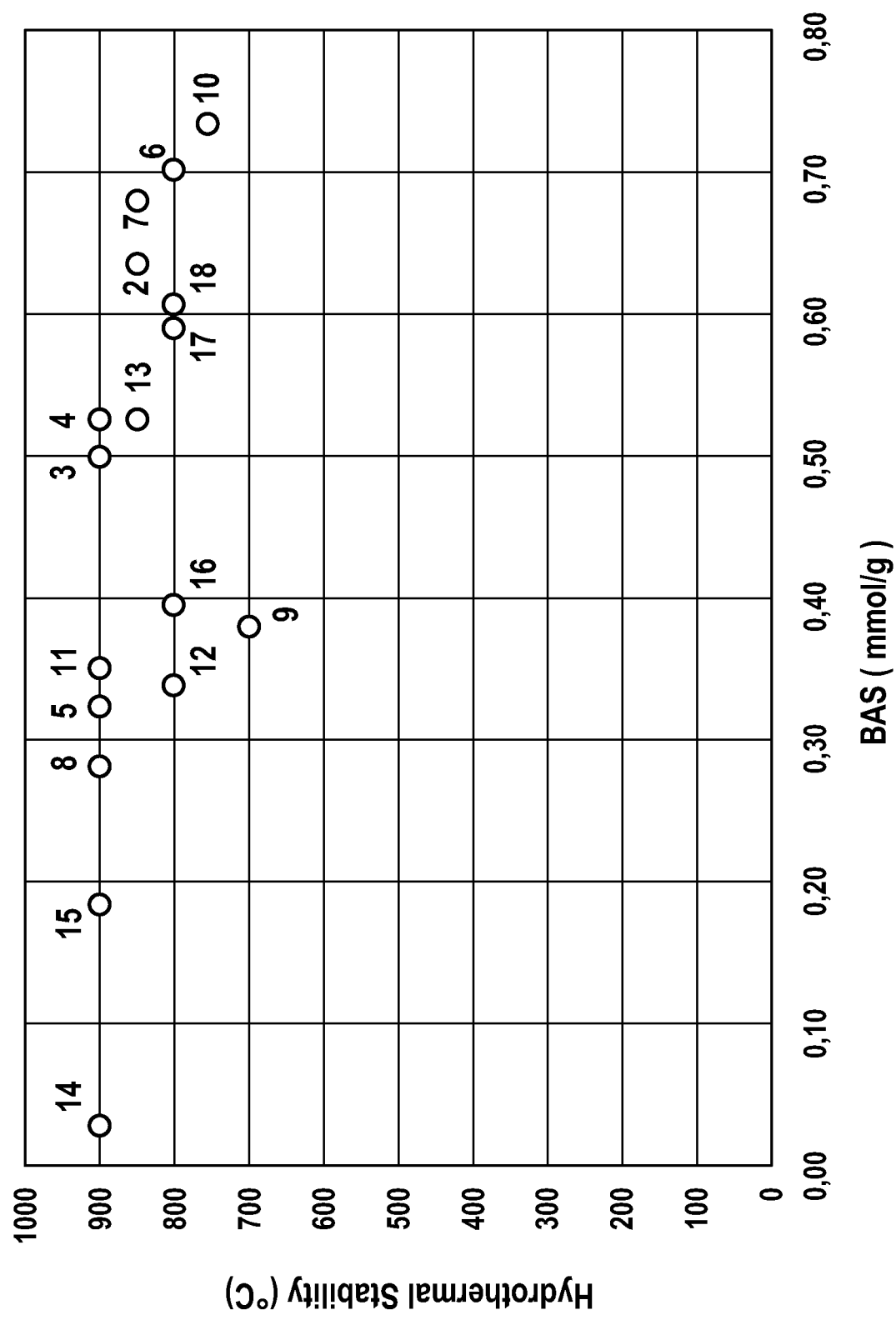

FIG. 17 shows the hydrothermal stability versus the proton content for embodiments 1 to 18.

The Cu content is calculated as CuO.

TABLE 3

Composition of the synthesis gels from Embodiment 1 to 18

| Embodiment No. | Framework Type | SiO₂ (mol) | Al₂O₃ (mol) | SDA 1 (mol) | SDA 2 (mol) | Me 1 (mol) | Me 2 (mol) | RBr (mol) | H₂O (mol) | Proton Content (mmol/g) | Cu (wt.-%) | Hydrothermal Stability (° C.) |
|---|---|---|---|---|---|---|---|---|---|---|---|---|
| 1 | AEI | 1 | 0.027 | 0.15 | | 0.87 | | | 30.1 | 2.4 | 3.8 | 800 |
| 2 | AEI | 1 | 0.012 | 0.17 | | 0.55 | | | 27.9 | 2.3 | 3.2 | 850 |
| 3 | AEI | 1 | 0.012 | 0.17 | | 0.56 | | | 48.3 | 1.6 | 2.9 | 900 |

TABLE 3-continued

Composition of the synthesis gels from Embodiment 1 to 18

| Embodiment No. | Framework Type | SiO$_2$ (mol) | Al$_2$O$_3$ (mol) | SDA 1 (mol) | SDA 2 (mol) | Me 1 (mol) | Me 2 (mol) | RBr (mol) | H$_2$O (mol) | Proton Content (mmol/g) | Cu (wt.-%) | Hydrothermal Stability (° C.) |
|---|---|---|---|---|---|---|---|---|---|---|---|---|
| 4 | AEI | 1 | 0.012 | 0.17 | 1.86 | 0.56 | | | 48.3 | 1.5 | 3.1 | 900 |
| 5 | AEI | 1 | 0.013 | 0.17 | | 0.55 | | | 30.6 | 1.3 | 2.9 | 900 |
| 6 | CHA | 1 | 0.025 | 0.02 | 0.36 | 0.39 | 0.041 | | 20.75 | 2.3 | 4.1 | 800 |
| 7 | CHA | 1 | 0.025 | 0.02 | 0.36 | 0.39 | | | 20.75 | 2.0 | 3.9 | 850 |
| 8 | CHA | 1 | 0.043 | 0.04 | 0.73 | 0.46 | 0.08 | 0.11 | 62.0 | 1.8 | 2.8 | 900 |
| 9 | LEV | 1 | 0.032 | 0.57 | | 0.23 | | | 6.0 | 3.3 | 4.1 | 700 |
| 10 | LEV | 1 | 0.049 | 0.50 | | 0.05 | | | 5.0 | 3.1 | 4.1 | 750 |
| 11 | LEV | 1 | 0.036 | 0.32 | | 0.12 | | | 39.6 | 1.5 | 0.8 | 900 |
| 12 | ERI/CHA | 1 | 0.025 | 0.02 | 0.36 | 0.39 | 0.41 | 0.18 | 20.75 | 3.0 | 4.3 | 800 |
| 13 | ETL | 1 | 0.033 | 0.39 | | 0.39 | | | 46.5 | 1.6 | 1.2 | 850 |
| 14 | ESV | 1 | 0.04 | 0.25 | | 1.03 | | | 40.0 | 1.0 | 4.1 | 900 |
| 15 | DDR | 1 | 0.033 | 0.42 | | 0.12 | | | 50.1 | 1.3 | 1.6 | 900 |
| 16 | KFI | 1 | 0.09 | | | 0.47 | 0.009 | | 13.8 | 2.8 | 4.2 | 800 |
| 17 | UFI | 1 | 0.062 | 1.01 | 0.14 | | | | 22.3 | 2.8 | 3.8 | 800 |
| 18 | AFX | 1 | 0.032 | 0.094 | | 0.76 | | | 30.5 | 2.2 | 5.6 | 800 |

All embodiments 1 to 18 indicate the respective gel composition. In table 3, the molar amounts of the respective components of the gels have been referred to 1 mol of SiO$_2$. SDA1 is the first named SDA (structure directing agent) of the gel composition of the respective embodiment, and SDA2—if present—is the second one.

Me1 refers to the molar amount of the first listed metal hydroxide Me(OH). In the embodiments 1 to 18, Me(OH) always dealt with an alkali metal hydroxide. Thus, the molar amount of Me1 is identical to that of the respective alkali metal hydroxide.

Me2 refers to the molar amount of the metal of the second listed alkali or alkaline earth metal component.

RBr represents hexamethonium bromide.

The Cu content is calculated as CuO.

Embodiment 21: Determination of NH$_3$—SRC Catalytic Activity

NH$_3$—SCR activity after hydrothermal ageing at 900° C. as described in Embodiment 21 are measured for zeolites from Embodiment 3, 5, 8, 13 and 15 (see Table 2). Catalyst pellets (125-250 μm) consisting of compressed zeolite powder are loaded in a quartz fixed bed tubular continuous flow reactor with on-line reaction product analysis. The catalyst first undergoes a pretreatment under simulated air flow conditions, i.e. 5% O2 and 95% N$_2$, at 450° C., the highest temperature of the catalytic testing. After pretreatment, the catalyst temperature is decreased to 150° C. A typical gas composition for NH$_3$—SCR performance evaluation consists of 500 ppm NO, 450 ppm NH$_3$, 5% O$_2$, 2% CO$_2$, 2.2% H$_2$O. The gas hourly space velocity (GHSV) will be fixed at 30 000 h$^{-1}$, obtained with 0.5 cm$^3$ catalyst bed and a gas flow of 250 mL/min. The temperature will be stepwise increased from 150 to 450° C. with fixed temperature ramps, and 50° C. intervals. Isothermal periods of 60 to 120 minutes are foreseen before reaction product sampling at each temperature plateau. A return point to 150° C. enables detection of degradation of catalytic performance during the testing.

TABLE 4

NH$_3$—SCR catalytic activity of Embodiment 3 (AEI), Embodiment 5 (AEI), Embodiment 8 (CHA), Embodiment 13 (ETL) and Embodiment 15 (DDR)

| | NO$_x$ conversion (%) | | | | |
|---|---|---|---|---|---|
| Temperature (° C.) | Embodiment 3 (GV191) | Embodiment 5 (GV228) | Embodiment 8 (GV251) | Embodiment 13 (SK120) | Embodiment 15 (GV176) |
| 150 | 55 | 52 | 81 | 8 | 22 |
| 175 | 75 | 72 | 95 | 12 | 40 |
| 200 | 88 | 85 | 92 | 17 | 48 |
| 250 | 87 | 92 | 88 | 36 | 70 |
| 300 | 85 | 88 | 88 | 53 | 65 |
| 350 | 84 | 87 | 87 | 57 | 57 |
| 400 | 81 | 85 | 85 | 53 | 49 |
| 450 | 79 | 84 | 83 | 48 | 35 |
| 150 | 54 | 51 | 81 | 9 | 21 |

Comparative Example 1

1122.2 mg of an aqueous solution of copper sulfate (CuSO$_4$) was mixed with 266.2 mg of tetraethylenepentamine (TEPA) in order to prepare in-situ the copper organometallic complex, and the resulting mixture was stirred for 2 hours. Afterwards, 9487.3 mg of an aqueous solution of tetraethylammonium hydroxide (TEAOH) (35 wt.-% in water) and 1150.1 mg of an aqueous solution of 20 wt.-% NaOH were added, and the resulting mixture was stirred for 15 minutes. Lastly, 3608.5 mg of a zeolite with a FAU structure (CBV-720, SAR=21) was introduced into the synthesis mixture and stirred for the time required to evaporate the excess water until the desired gel concentration was achieved.

The final composition of the gel is $SiO_2$: 0.047 $Al_2O_3$: 0.022 $Cu(TEPA)^{2+}$: 0.4 TEAOH: 0.1 NaOH:4 $H_2O$. The resulting gel was transferred to an autoclave with Teflon liner. The crystallization was carried out at 160° C. for 7 days under static conditions. The solid product was filtered, rinsed with plenty of water, dried at 100° C. and then calcined in air at 550° C. for 4 hours in order to remove the organic residues.

Proton content: 2.2 mmol/g

The zeolite obtained was not hydrothermally stable after 900° C. hydrothermal aging.

Comparative Example 2

380.2 mg of an aqueous solution of 20 wt.-% of $CuSO_4$ was mixed with 90.2 mg of tetraethylenepentamine (TEPA) and stirred for 2 hours. Then, 1578.0 mg of an aqueous solution of tetraethylammoniumhydroxide (TEAOH) (35 wt.-%) and 230.1 mg of an aqueous solution of NaOH (20 wt.-% in $H_2O$) were added, and the resulting mixture was stirred for 15 min. Lastly, 601.3 mg of a zeolite with a FAU structure (CBV-720, SAR=21) was introduced into the synthesis mixture and stirred for the time required to evaporate the excess water until the desired gel concentration was achieved. The final composition of the gel is $SiO_2$: 0.047 $Al_2O_3$: 0.045 $Cu(TEPA)^{2+}$:0.4 TEAOH:0.1 NaOH:4 $H_2O$. The resulting gel was transferred to an autoclave with Teflon liner.

The crystallization was carried out at 160° C. for 7 days under static conditions. The solid product was filtered, rinsed with plenty of water, dried at 100° C. and then calcined in air at 550° C. for 4 hours in order to remove the organic residues.

Proton content: 2.5 mmol/g

The zeolite obtained was not hydrothermally stable after 900° C. hydrothermal aging.

Comparative Example 3

234.0 mg of an aqueous solution of 20 wt.-% of $CuSO_4$ was mixed with 53.2 mg of tetraethylenepentamine (TEPA) and stirred for 2 hours. Then, 959.1 mg of an aqueous solution of tetraethylammoniumhydroxide (TEAOH) (35 wt.-%) and 225.1 mg of an aqueous solution of NaOH (20 wt.-% in $H_2O$) were added, and the resulting mixture was stirred for 15 min. Lastly, 365.3 mg of a zeolite with a FAU structure (CBV-720, SAR=21) was introduced into the synthesis mixture and stirred for the time required to evaporate the excess water until the desired gel concentration was achieved. The final composition of the gel is $SiO_2$:0.047 $Al_2O_3$:0.045 $Cu(TEPA)^{2+}$:0.4 TEAOH:0.2 NaOH:13 $H_2O$. The resulting gel was transferred to an autoclave with Teflon liner.

The crystallization was carried out at 160° C. for 7 days under static conditions. The solid product was filtered, rinsed with plenty of water, dried at 100° C. and then calcined in air at 550° C. for 4 hours in order to remove the organic residues.

Proton content: 2.2 mmol/g

The zeolite obtained was not hydrothermally stable after 900° C. hydrothermal aging.

Comparative Example 4 a) Synthesis of Cu-Tetraethylenepentamine complex (Cu-TEPA): 37.9 g tetraethylenepentamine (0.2 mole) was added under stirring to a solution consisting of 50 g $CuSO_4.5H_2O$ (0.2 mole) in 200 g of $H_2O$ (1 M solution) and left to stir for 2 h at room temperature.

b) 3 g of zeolite Y with SAR=30 (Si/Al=15) (CBV720 supplied by Zeolyst International) was suspended in 27 mL of a 1.2 M solution of sodium hydroxide. To this solution 1.5 mL of a 1 M Cu-TEPA solution was added. The final gel had the following molar ratios: 1 $SiO_2$/0.033 $Al_2O_3$/0.033 Cu-TEPA/0.70 NaOH/34 $H_2O$. The suspension was stirred for 10 minutes at room temperature, before being transferred to an oven at 95° C. and left statically for 7 days. After cooling to room temperature, the powder was separated from the mother liquor by filtration, washed with demineralized water and dried at 60° C. for 12 h. The zeolite produced was determined to have the CHA framework type code according to X-ray diffraction (see FIG. 1) with a Si/Al ratio of 4.3 and a CuO content of 7.5 wt. %, calculated as CuO.

Proton content: 4.02 mmol/g

The zeolite obtained was not hydrothermally stable after 900° C. hydrothermal aging.

TABLE 4

Gel compositions, ageing conditions, proton and Cu contents of the CHA examples

| Source | $SiO_2$ (mol) | $Al_2O_3$ (mol) | $Cu(TEPA)^{2+}$ (mol) | TEAOH (mol) | NaOH (mol) | $H_2O$ (mol) | KCl (mol) | RBr (mol) | Heating time gel | Heating temp. (gel) | Gel ageing | Proton content (mmol/g) | Cu cont. (wt.-%) | Hydrotherm. stability |
|---|---|---|---|---|---|---|---|---|---|---|---|---|---|---|
| CE 1 | 1 | 0.047 | 0.022 | 0.4 | 0.1 | 4 | | | 7 days | 160° C. | static | 2.2 | n.d. | <900° C. |
| CE 2 | 1 | 0.047 | 0.045 | 0.4 | 0.1 | 4 | | | 7 days | 160° C. | static | 2.5 | n.d. | <900° C. |
| CE 3 | 1 | 0.047 | 0.045 | 0.4 | 0.2 | 13 | | | 7 days | 160° C. | static | 2.2 | n.d. | <900° C. |
| CE 4 | 1 | 0.033 | 0.033 | | 0.7 | 34 | | | 7 days | 95° C. | static | 4.02 | 5.9 | <900° C. |
| Emb 6 | 1 | 0.025 | 0.02 | 0.36 | 0.39 | 20.75 | | | 4 days | 150° C. | dynamic | 2.3 | 4.1 | 800° C. |
| Emb 7 | 1 | 0.025 | 0.02 | 0.36 | 0.39 | 20.75 | | | 4 days | 150° C. | dynamic | 2.0 | 3.9 | 850° C. |
| Emb 8 | 1 | 0.043 | 0.04 | 0.73 | 0.46 | 62 | 0.08 | 0.11 | 7 days | 160° C. | dynamic | 1.8 | 2.8 | 900° C. |

CE comparative example
Emb embodiment
RBr hexamethoniumbromide
n.d. not detected
All Cu contents were calculated as CuO.

The Comparative Examples were tested for their hydrothermal stability at 900° C.

Table 5 shows the total proton content, the hydrothermal stability, the Bronsted acid sites (BAS), the silanol protons (Si—OH), the aluminol protons (Al—OH) and the residual protons of the embodiments 1 to 18.

The skilled person knows that zeolites comprise protons which can unambiguously assigned to a specific site, namely to Bronsted acid sites (BAS), or to silanol groups (SiOH), or to aluminol groups (Al—OH). In addition, there are protons which cannot be clearly assigned to a specific site. These protons are hereinafter referred to as "residual protons".

The data clearly show that the overall amount of protons, i.e. the sum of BAS, Si—OH, Al—OH and residual protons, has to be taken into account when assessing the hydrothermal stability of a zeolite.

TABLE 5

Total proton content, the hydrothermal stability, the Bronsted acid sites (BAS), the silanol protons (Si—OH), the aluminol protons (Al—OH) and the residual protons of the embodiments 1 to 18

| Embodiment No. | Framework Type | BAS | Al—OH | Si—OH | Al—OH + Si—OH | Sum BAS + Si—OH + Al—OH | Residual protons | Total Proton Content (mmol/g) | Hydrothermal Stability (° C.) |
|---|---|---|---|---|---|---|---|---|---|
| 1 | AEI | 0.336 | 1.734 | 0.072 | 1.806 | 2.143 | 0.257 | 2.4 | 800 |
| 2 | AEI | 0.634 | 0.751 | 0.111 | 0.863 | 1.497 | 0.803 | 2.3 | 850 |
| 3 | AEI | 0.498 | 0.742 | 0.095 | 0.837 | 1.335 | 0.265 | 1.6 | 900 |
| 4 | AEI | 0.524 | 0.604 | 0.132 | 0.736 | 1.260 | 0.240 | 1.5 | 900 |
| 5 | AEI | 0.322 | 0.570 | 0.059 | 0.629 | 0.951 | 0.349 | 1.3 | 900 |
| 6 | CHA | 0.700 | 1.054 | 0.263 | 1.317 | 2.017 | 0.283 | 2.3 | 800 |
| 7 | CHA | 0.677 | 0.925 | 0.197 | 1.123 | 1.799 | 0.201 | 2.0 | 850 |
| 8 | CHA | 0.280 | 0.284 | 0.031 | 0.315 | 0.596 | 1.204 | 1.8 | 900 |
| 9 | LEV | 0.377 | 0.365 | 0.134 | 0.498 | 0.875 | 2.425 | 3.3 | 700 |
| 10 | LEV | 0.732 | 0.574 | 0.316 | 0.890 | 1.622 | 1.478 | 3.1 | 750 |
| 11 | LEV | 0.349 | 0.410 | 0.009 | 0.418 | 0.767 | 0.733 | 1.5 | 900 |
| 12 | ERI/CHA | 0.338 | 1.688 | 0.280 | 1.968 | 2.306 | 0.694 | 3.0 | 800 |
| 13 | ETL | 0.523 | 0.470 | 0.248 | 0.718 | 1.240 | 0.360 | 1.6 | 850 |
| 14 | ESV | 0.026 | 0.496 | 0.170 | 0.667 | 0.693 | 0.307 | 1.0 | 900 |
| 15 | DDR | 0.182 | 0.199 | 0.084 | 0.283 | 0.465 | 0.835 | 1.3 | 900 |
| 16 | KFI | 0.393 | 1.481 | 0.651 | 2.132 | 2.525 | 0.275 | 2.8 | 800 |
| 17 | UFI | 0.588 | 1.221 | 0.622 | 1.842 | 2.430 | 0.370 | 2.8 | 800 |
| 18 | AFX | 0.604 | 0.907 | 0.317 | 1.224 | 1.829 | 0.371 | 2.2 | 800 |

BAS, Si—OH, Al—OH, residual protons and the total proton content are indicated in mmol/g zeolite.

The invention claimed is:

1. A crystalline aluminosilicate zeolite having a maximum pore size of eight tetrahedral atoms, wherein the zeolite has a total proton content of less than 2 mmol per gram, and wherein the zeolite framework type material is chosen from AEI, CHA, LEV, ETL, ESV, and DDR.

2. The crystalline aluminosilicate zeolite according to claim 1, wherein the SAR is between 5 and 50.

3. The crystalline aluminosilicate zeolite according to claim 1, wherein the zeolite comprises at least one transition metal in a concentration of 0.1 to 10 wt.-%, calculated as the respective oxides and based on the total weight of the zeolite.

4. The crystalline aluminosilicate zeolite according to claim 3, wherein the at least one transition metal is chosen from copper, iron, and mixtures thereof.

5. The crystalline aluminosilicate zeolite according to claim 3, wherein the at least one transition metal is introduced into the zeolite during the synthesis of said zeolite by an organic structure-directing agent comprising said at least one transition metal.

6. The crystalline aluminosilicate zeolite according to claim 1, wherein the zeolite comprises at least one alkali and/or alkaline earth metal in a concentration of 0 to 2 wt.-%, calculated as the respective metals and based on the total weight of the zeolite.

7. The crystalline aluminosilicate zeolite according to claim 6, wherein the at least one alkali or alkaline earth metal is selected from sodium, potassium, and mixtures thereof.

8. The crystalline aluminosilicate zeolite according to claim 1, wherein the transition metal to aluminium atomic ratio is in the range of between 0.003 to 0.5.

9. The crystalline aluminosilicate zeolite according to claim 1, wherein the mean crystal size is between 0.3 to 7 μm.

10. The crystalline aluminosilicate zeolite according to claim 1, wherein the zeolite is present in the form of a washcoat on a carrier substrate.

11. A process for the removal of NOx from automotive combustion exhaust gases wherein a zeolite according to claim 1 is used as the SCR catalytically active material for the conversion of NOx.

12. A catalysed substrate monolith comprising an SCR catalytically active material for the conversion of NOx for use in treating automotive combustion exhaust gases, wherein said SCR catalytically active material for the conversion of NOx is a zeolite according to claim 1.

13. A catalysed substrate monolith according to claim 12, wherein the zeolite is present in the form of a washcoat on a carrier substrate.

14. The catalysed substrate monolith according to claim 13, wherein the carrier substrate is a flow-through substrate or a wall-flow filter.

15. A catalysed substrate monolith according to claim 12, wherein the catalysed substrate monolith is an extruded catalysed substrate monolith.

16. An exhaust gas purification system comprising a particulate filter coated with an SCR catalyst, wherein the SCR catalytically active material is a crystalline aluminosilicate zeolite according to claim 1.

17. An exhaust gas purification system comprising a PNA catalyst, wherein the PNA catalytically active material comprises a crystalline aluminosilicate zeolite according to claim 1 and at least one platinum group metal selected from ruthenium, rhodium, palladium, osmium, iridium, platinum, and mixtures thereof.

18. An exhaust gas purification system according to claim 17, wherein the platinum group metal is palladium, and the palladium is present in a concentration of 0.5 to 5 wt.-%, calculated as Pd and based on the total weight of the zeolite.

19. An exhaust gas purification system comprising an ASC catalyst, wherein the ASC catalytically active material comprises a crystalline aluminosilicate zeolite according to claim 1 and at least one platinum group metal selected from ruthenium, rhodium, palladium, osmium, iridium, platinum, and mixtures thereof.

20. An exhaust gas purification system according to claim 19, wherein the platinum group metal is platinum, and the platinum is added in the form of a precursor salt to a washcoat slurry and applied to the carrier monolith, and the platinum is present in a concentration of 0.1 to 1 wt.-%, calculated as Pt and based on the total weight of the washcoat loading.

* * * * *